United States Patent
Allaire et al.

(10) Patent No.: US 12,152,165 B2
(45) Date of Patent: Nov. 26, 2024

(54) ANODE COATING COMPOSITIONS AND USES THEREOF

(71) Applicant: Laboratoire CIR inc., Blainville (CA)

(72) Inventors: Claude Allaire, Saint-Eustache (CA); Lobna Jerbi, Sainte-Thérèse (CA); Maria V. Torrealba, Montreal (CA)

(73) Assignee: Ghislain Gonthier, Blainville (CA)

(*) Notice: Subject to any disclaimer, the term of this patent is extended or adjusted under 35 U.S.C. 154(b) by 934 days.

(21) Appl. No.: 17/271,692

(22) PCT Filed: Sep. 6, 2018

(86) PCT No.: PCT/CA2018/051083
§ 371 (c)(1),
(2) Date: Feb. 26, 2021

(87) PCT Pub. No.: WO2020/047643
PCT Pub. Date: Mar. 12, 2020

(65) Prior Publication Data
US 2021/0261791 A1    Aug. 26, 2021

(51) Int. Cl.
*C09D 1/00* (2006.01)
*C09D 5/08* (2006.01)
*C09D 7/61* (2018.01)
*C09D 7/65* (2018.01)
*C08K 3/22* (2006.01)
*C08K 3/26* (2006.01)
(Continued)

(52) U.S. Cl.
CPC ............ *C09D 5/084* (2013.01); *C09D 1/00* (2013.01); *C09D 7/61* (2018.01); *C09D 7/65* (2018.01); C08K 2003/2227 (2013.01); C08K 2003/262 (2013.01); C08K 3/36 (2013.01); C08L 51/003 (2013.01)

(58) Field of Classification Search
CPC . C09D 1/00; C09D 5/084; C09D 5/08; C09D 7/61; C08K 2003/262; C09K 15/02
See application file for complete search history.

(56) References Cited

U.S. PATENT DOCUMENTS

| | | | |
|---|---|---|---|
| 2011/0117432 A1* | 5/2011 | Kay | H01M 10/0525 29/623.5 |
| 2014/0037890 A1* | 2/2014 | McJunkins | A61Q 19/00 428/323 |
| 2019/0262894 A1* | 8/2019 | Cucitore | B22C 9/10 |

FOREIGN PATENT DOCUMENTS

| CN | 1354390 A | 6/2002 |
|---|---|---|
| CN | 107057412 | 8/2017 |

(Continued)

OTHER PUBLICATIONS

Machine translation of Haruta et al (WO2006038681), publication date Apr. 13, 2006.*

(Continued)

*Primary Examiner* — Jun Li
(74) *Attorney, Agent, or Firm* — Benoit & Cote

(57) ABSTRACT

The present document describes an aqueous coating composition for preventing or reducing air oxidation of a carbon material, and aqueous priming coating composition for application to a carbon material prior to application of the aqueous coating composition, chemical treatment of a carbon material comprising both the aqueous coating composition and aqueous priming coating composition, and methods of coating carbon material with the compositions.

21 Claims, 15 Drawing Sheets

(51) Int. Cl.
   *C08K 3/36*     (2006.01)
   *C08L 51/00*    (2006.01)

(56)           References Cited

FOREIGN PATENT DOCUMENTS

| CN | 108285661 A   * | 7/2018  |         |
|----|-----------------|---------|---------|
| DE | 102008033447 B3 | 11/2009 |         |
| JP | 4943609 B2    * | 5/2012  | ............... C09D 5/10 |
| WO | 9936593         | 7/1999  |         |
| WO | 02/43881        | 6/2002  |         |
| WO | WO2006038681 A1 | 4/2006  |         |
| WO | 2007/075497     | 7/2007  |         |
| WO | WO-2009012029 A2 * | 1/2009 | ............... C09D 1/00 |
| WO | 2011/008271     | 1/2011  |         |
| WO | 2016/190837     | 12/2016 |         |

OTHER PUBLICATIONS

Supplementary European Search Report of Corresponding European Application No. 18932592.1; Munich; Apr. 13, 2022; Glomm Bernhard.
English Abstract of CN1354390.
English Abstract of DE102008033447.
European Search Report, Application No. 24161847.9, Apr. 9, 2024, Gonthier, Ghislain.
International Search Report, PCT/CA2018/051083, Mar. 26, 2019, Bayaa A.

* cited by examiner

| Residual carbon content (wt. %) ||
|---|---|
| Without coating | With coating |
| 2,75% | 97,16% |

| @ 650°C x 20hrs on air | | Original anode sample |
|---|---|---|
| With coating | W/O coating | appearence |
|  |  |  |

| Residual carbon content (wt. %) | | |
|---|---|---|
| 99,66 | 2,52 | Non applicable |

Appearance of the butt obtained from a coated anode

Appearance of the butt obtained from an uncoated anode

ANODE COATING COMPOSITIONS AND USES THEREOF This application is a U.S. National Phase application under 35 U.S.C. § 371 of PCT/CA2018/051083, filed Sep. 6, 2018, the specification of which is hereby incorporated by reference in its entirety.

BACKGROUND

(a) Field

The subject matter disclosed generally relates to coating compositions and uses thereof. More particularly, the subject matter relates to coating compositions for forming an interface between carbon materials, and the use of these compositions for the limitation of carbon corrosion, particularly for decreasing air reactivity of aluminum reduction cell's anodes.

(b) Related Prior Art

Techniques to prevent or reduce air oxidation of carbon materials include the use of coatings. Such coatings are conventionally made of compounds promoting, upon heating, the formation of a glassy phase over the carbon material, such as silicon and boron oxides when mixed with glass modifiers such as alkalies and/or earth alkalies. The formation of such glassy phases is however possible only at temperature higher than about 600° C. Since the top part of carbon anodes in aluminum electrolysis cells is usually exposed to temperature as low as 400° C., their portion lying between 400° C. and 600° C. can therefore not be protected against air oxidation by such glassy phases. Moreover, boron is a contaminant for several aluminum alloy applications, and its use is therefore undesirable in these applications.

Therefore, there is a need for coating to prevent or reduce air oxidation of carbon materials such as anodes used in aluminum electrolysis cells.

Also, there is a need for coating to prevent or reduce air oxidation of carbon materials having melting temperate of about 400° C.

Also there is a need for coating that to prevent or reduce air oxidation of carbon materials that do not comprise boron.

Also, there is a need for coating that to prevent or reduce air oxidation of carbon materials that mitigate the disadvantages of the existing products.

SUMMARY

According to an embodiment, there is provided an aqueous coating composition for preventing or reducing air oxidation of a carbon material comprising:
  an aqueous solution comprising a combination of a sodium salt of carbonate and a potassium salt of carbonate providing an equivalent $Na_2O:K_2O$ molar ratio of about 0.4 to about 2.0, and water,
the aqueous coating having a melting temperature of up to about 600° C.

The aqueous coating may further comprise a lithium salt providing an equivalent $Li_2O$ molar content varying between about 17% and about 74% of the composition.

The equivalent $Na_2O:K_2O$ molar ratio may be from about 0.4 to about 1.8 and provides an aqueous coating having a melting temperature of from about 370° C. to about 430° C.

The aqueous coating has a melting temperature of from about 400° C.

The sodium salt of carbonate may be selected from the group consisting of sodium carbonate ($Na_2CO_3$), and sodium bicarbonate ($NaHCO_3$), and combinations thereof.

The potassium salt of carbonate may be selected from the group consisting of potassium carbonate ($K_2CO_3$), and potassium bicarbonate ($KHCO_3$), and combinations thereof.

The lithium salt may comprise:
  a lithium salt of carbonate selected from the group consisting of lithium carbonate ($Li_2CO_3$), lithium bicarbonate ($LiHCO_3$), and combinations thereof,
  LiF, a mixture of LiF and NaF, and
  combinations of all of the above.

The combination of a sodium salt of carbonate and a potassium salt of carbonate may be a combination of sodium carbonate and potassium carbonate.

The combination of a sodium salt of carbonate and a potassium salt of carbonate may be a combination of sodium bicarbonate and potassium bicarbonate.

The concentration of the sodium carbonate may be from about 7% to about 17% w/w of the aqueous coating composition.

The sodium carbonate may be from about 12% to about 14% w/w of the aqueous coating composition.

The sodium carbonate may be from about 12.75% to about 13.59% w/w of the aqueous coating composition.

The concentration of the sodium bicarbonate may be from about 11% to about 31% w/w of the aqueous coating composition.

The concentration of the sodium bicarbonate may be about 21.68% w/w of the aqueous coating composition.

The concentration of the potassium carbonate may be from about 15% to about 25% w/w of the aqueous coating composition.

The concentration of the potassium carbonate may be from about 20% to about 22% w/w of the aqueous coating composition.

The concentration of the potassium carbonate may be from about 20.32% to about 21.67% w/w of the aqueous coating composition.

The concentration of the potassium bicarbonate may be from about 19% to about 43% w/w of the aqueous coating composition.

The concentration of the potassium bicarbonate may be about 31.58% w/w of the aqueous coating composition.

The lithium salt may be lithium carbonate.

The lithium carbonate may be in suspension in the aqueous coating composition.

The concentration of the lithium carbonate may be from about 8% to about 18% w/w of the aqueous coating composition.

The concentration of the lithium carbonate may be from about 13.83% to about 14.74% w/w of the aqueous coating composition.

The aqueous coating may further comprise a liquid binder.

The liquid binder may comprise colloidal silica, colloidal alumina, a deflocculant and combinations thereof.

The concentration of the colloidal silica may be up to 5% w/w of the aqueous coating composition.

The concentration of the colloidal silica may be 0.65% w/w of the aqueous coating composition.

The concentration of the colloidal alumina may be up to 8% w/w of the aqueous coating composition.

The concentration of the colloidal alumina may be 5.55% w/w of the aqueous coating composition.

The deflocculant may be a polyethylene glycol graft polymer.

The concentration of the deflocculant may be up to 6% w/w of the aqueous coating composition.

According to another embodiment, there may be provided an aqueous priming coating composition for application to a carbon material comprising:
 a mixture of aluminum oxide ($Al_2O_3$), comprising a combination of aluminum oxide selected from the group consisting of calcined aluminum oxide, reactive aluminum oxide, and white fused aluminum oxide; and water.

The concentration of the calcined aluminum oxide may be from about 32% to 41% w/w of the aqueous priming coating composition.

The concentration of the calcined aluminum oxide may be from about 35.29% to 38.07% w/w of the aqueous priming coating composition.

The concentration of the reactive aluminum oxide may be from about 6% to 9% w/w of the aqueous priming coating composition.

The concentration of the reactive aluminum oxide may be from about 7.41% to 7.99% w/w of the aqueous priming coating composition.

The concentration of the white fused aluminum oxide may be from about 31% to 40% w/w of the aqueous priming coating composition.

The concentration of the white fused aluminum oxide may be from about 34.13% to 36.81% w/w of the aqueous priming coating composition.

The white fused aluminum oxide has particle size of up to about 0.2 mm.

The aqueous priming coating composition may further comprise a calcium salt of carbonate.

The calcium salt of carbonate may be selected from the group consisting of calcium carbonate ($CaCO_3$), calcium bicarbonate [$Ca(HCO_3)_2$], and combinations thereof.

The concentration of the calcium carbonate may be up to 5% w/w.

The concentration of the calcium carbonate may be 3.8% w/w.

The aqueous priming coating composition may further comprise a liquid binder.

The liquid binder may comprise colloidal silica, colloidal alumina, a deflocculant and combinations thereof.

The concentration of the colloidal silica may be up to 12% w/w of the aqueous priming coating composition.

The concentration of the colloidal silica may be from about 1.22% to about 9.49% w/w of the aqueous priming coating composition.

The concentration of the colloidal alumina may be up to 14% w/w of the aqueous priming coating composition.

The concentration of the colloidal alumina may be 10.36% w/w of the aqueous priming coating composition.

The deflocculant may be a polyethylene glycol graft polymer.

The concentration of the deflocculant may be from about 6% to about 10% w/w of the aqueous priming coating composition.

The concentration of the deflocculant may be from about 7.42% to about 7.64% w/w of the aqueous priming coating composition.

According to another embodiment, there may be provided a chemical treatment for preventing or reducing air oxidation of a carbon material comprising:
 a first layer comprising an aqueous priming coating composition according to the present invention, covering an external surface exposed to air of the carbon material; and
 a second layer, covering the first layer, comprising an aqueous coating composition according to the present invention.

According to another embodiment, there may be provided a chemical treatment for preventing or reducing air oxidation of a carbon material comprising:
 an intermediate substrate, covering an external surface exposed to air of the carbon material; and
 a layer of an aqueous coating composition according to the present invention, covering the intermediate substrate.

The first layer may have a wet film thickness of about 0.3 mm to about 1 mm.

The first layer may have a wet film thickness of about 0.5±0.1 mm.

The second layer or the layer of an aqueous coating composition may have a wet film thickness of about 0.15 mm to about 0.50 mm.

The second layer may have a wet film thickness of about 0.25±0.05 mm.

The chemical treatment may have a residual water content of about 12% w/w or less.

According to another embodiment, there may be provided a method of coating a carbon material comprising the step of contacting a carbon material having an intermediate substrate covering an external surface exposed to air of the carbon material, with an aqueous coating composition according to the present invention, to form a layer thereon.

The intermediate substrate may be a first layer comprising an aqueous priming coating composition according to the present invention.

The aqueous coating composition may be applied between about 5 mins to about 2 hours after application of the intermediate substrate.

The intermediate substrate may form a first layer having a wet film thickness of about 0.3 mm to about 1 mm.

The intermediate substrate may form a first layer having a wet film thickness of about 0.5±0.1 mm.

The aqueous coating composition may form a second layer having a wet film thickness of about 0.15 mm to about 0.50 mm.

The aqueous coating composition may form a second layer having a wet film thickness of about 0.25±0.05 mm.

The aqueous coating composition may be applied at a viscosity of about 16.5 to about 17 cPoise.

The aqueous coating composition may be applied at a temperature of about 50° C.

The method may further comprise the step of contacting the external surface exposed to air of the carbon material with the intermediate substrate, prior to contacting the intermediate substrate with the aqueous composition.

The method may comprise multiple application of the intermediate substrate.

The method may comprise multiple application of the aqueous coating composition.

According to another embodiment, there may be provided a method for preparation of an aqueous coating formulation comprising the steps of
 a) solubilization in water of a sodium salt of carbonate in the presence of a potassium salt of carbonate to provide an equivalent $Na_2O:K_2O$ molar ratio varying between about 0.4 and 1.8, with sufficient mechanical and thermal energy to obtain a stable solution having no precipitation or hydrate formation, to obtain a first salt solution;

b) mixing in the first salt solution an equivalent $Li_2O$ molar content varying between about 17% and about 74% of the composition, to obtain the aqueous coating formulation.

The sodium salt of carbonate may be selected from the group consisting of sodium carbonate ($Na_2CO_3$), and sodium bicarbonate ($NaHCO_3$), and combinations thereof.

The potassium salt of carbonate may be selected from the group consisting of potassium carbonate ($K_2CO_3$), and potassium bicarbonate ($KHCO_3$), and combinations thereof.

The equivalent $Li_2O$ molar content may be provided from:
- a lithium salt of carbonate selected from the group consisting of lithium carbonate ($Li_2CO_3$), lithium bicarbonate ($LiHCO_3$), and combinations thereof,
- LiF, a mixture of LiF and NaF, and
- combinations of all of the above.

The sodium salt of carbonate and potassium salt of carbonate may be a combination of sodium carbonate and potassium carbonate.

The sodium salt of carbonate and potassium salt of carbonate may be a combination of sodium bicarbonate and potassium bicarbonate.

The concentration of the sodium carbonate may be from about 7% to about 17% w/w of the aqueous coating composition.

The concentration of the sodium carbonate may be from about 12% to about 14% w/w of the aqueous coating composition.

The concentration of the sodium carbonate may be from about 12.75% to about 13.59% w/w of the aqueous coating composition.

The concentration of the sodium bicarbonate may be from about 11% to about 31% w/w of the aqueous coating composition.

The concentration of the sodium bicarbonate may be about 21.68% w/w of the aqueous coating composition.

The concentration of the potassium carbonate may be from about 15% to about 25% w/w of the aqueous coating composition.

The concentration of the potassium carbonate may be from about 20% to about 22% w/w of the aqueous coating composition.

The concentration of the potassium carbonate may be from about 20.32% to about 21.67% w/w of the aqueous coating composition.

The concentration of the potassium bicarbonate may be from about 19% to about 43% w/w of the aqueous coating composition.

The concentration of the potassium bicarbonate may be about 31.58% w/w of the aqueous coating composition.

The lithium salt of carbonate may be lithium carbonate.

The lithium carbonate may be in suspension in the aqueous coating composition.

The concentration of the lithium carbonate may be from about 8% to about 18% w/w of the aqueous coating composition.

The concentration of the lithium carbonate may be from about 13.83% to about 14.74% w/w of the aqueous coating composition.

The method may further comprise a liquid binder.

The liquid binder may comprise colloidal silica, colloidal alumina, a deflocculant and combinations thereof.

The concentration of the colloidal silica may be up to 5% w/w of the aqueous coating composition.

The concentration of the colloidal silica may be 0.65% w/w of the aqueous coating composition.

The concentration of the colloidal alumina may be up to 8% w/w of the aqueous coating composition.

The concentration of the colloidal alumina may be 5.55% w/w of the aqueous coating composition.

The deflocculant may be a polyethylene glycol graft polymer.

The concentration of the deflocculant may be up to 6% w/w of the aqueous coating composition.

The sufficient thermal energy may be at least 50° C.

The sufficient mechanical energy may be 2 to 5 mJoule/sec.

The method may further comprise the step, after step b), of mixing in the liquid binder.

The stable solution having no precipitation or hydrate formation may be stable for at least one month at room temperature.

In the aqueous coating composition of the present invention, or the aqueous priming coating composition of the present invention, or the chemical treatment of the present invention, or the method of the present invention, the carbon material may be made from carbon selected from the group consisting of graphite, petroleum, metallurgical coke, a partially graphitized carbon, or amorphous carbon In the aqueous coating composition of the present invention, or the aqueous priming coating composition of the present invention, or the chemical treatment of the present invention, or the method of the present invention, the carbon material may be a carbon anode, preferably a prebaked consumable carbon anode.

The following terms are defined below.

The term "solution" is intended to mean a homogeneous mixture composed of two or more substances. Also, as used herein, the term aqueous solution is when one of the solvents is water. In such a mixture, a solute is a substance dissolved in another substance, known as a solvent. The mixing process of a solution happens at a scale where the effects of chemical polarity are involved, resulting in interactions that are specific to solvation. The solution assumes the phase of the solvent when the solvent is the larger fraction of the mixture, as is commonly the case. The concentration of a solute in a solution is the mass of that solute expressed as a percentage of the mass of the whole solution.

The term "carbon material" is intended to mean an object or item that is made from carbon (i.e., graphite, petroleum or metallurgical coke or any other partially graphitized carbon, amorphous carbon) such as prebaked consumable carbon anodes used in the process of aluminum smelting.

The term "liquid binder" is intended to mean a liquid or a colloidal suspension that can bind, at room temperature, following chemical transformations such as reactions, gelling or hydration, a set of particles. The latter, originally in the pulverulent state, are transformed by the action of the liquid binder into a rigid material (non-zero modulus of elasticity).

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Figure 1:
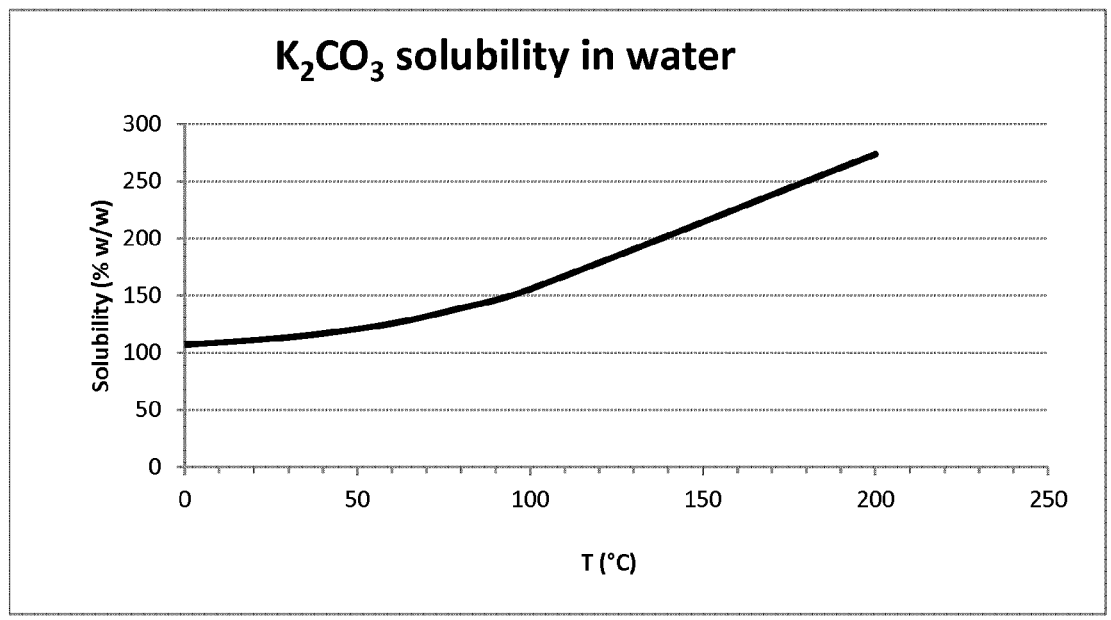
FIG. 1 illustrates the solubility of $K_2CO_3$ salt in water.

In embodiments there is disclosed an aqueous coating composition for preventing or reducing air oxidation of a carbon material (for example graphite, petroleum or metallurgical coke or any other partially graphitized carbon, amorphous carbon) comprising an aqueous solution comprising a combination of a sodium salt of carbonate and a potassium salt of carbonate, and water, the aqueous coating having a melting temperature of from about 600° C.

In an embodiment the aqueous coating composition for preventing or reducing air oxidation of a carbon material comprises an aqueous solution comprising a combination of a sodium salt of carbonate and a potassium salt of carbonate, a lithium salt, and water, the aqueous coating having a melting temperature of from about 370° C. to about 430° C. To the salts of sodium and potassium carbonate, an equivalent $Li_2O$ molar content varying between about 17% and 74% of the composition is added. The equivalent $Li_2O$ molar content is to be provided by lithium carbonate ($Li_2CO_3$), lithium bicarbonate ($LiHCO_3$), LiF, a mixture of LiF and NaF, or a combination or all of the above, to reach a theoretical melting temperature of 370° C. to 430° C., and preferably 400° C., although they have a very low solubility in water. Among $Li_2CO_3$, LiF and NaF, the former has the lowest density (2.11, versus 2.64 and 2.56 g/cm³, respectively). Among these salts, $Li_2CO_3$ leads to the lowest sedimentation rate into concentrated aqueous solutions of $Na_2CO_3$ and $K_2CO_3$.

An embodiment of the present invention concerns the formulation of a water paint which may be made from a mixture sodium salts of carbonate, potassium salts of carbonate. The sodium salt of carbonate and a potassium salt of carbonate are mixed in quantities that provide an equivalent $Na_2O:K_2O$ molar ratio of about 0.4 to about 2.0, to provide an aqueous coating having a melting temperature of up to 600° C.

The equivalent molar ratio for sodium and potassium salts of carbonate may be derived according to the following:

| Reaction | Molar equivalent |
| --- | --- |
| $2NaHCO_3 =$ $Na_2O + 2CO_2 + H_2O$ | 2 moles of sodium bicarbonate = 1 mole of $Na_2O$ equivalent |
| $2KHCO_3 =$ $K_2O + 2CO_2 + H_2O$ | 2 moles of potassium bicarbonate = 1 mole of $K_2O$ equivalent |
| $Na_2CO_3 = Na_2O + CO_2$ | 1 mole of sodium carbonate = 1 mole of $Na_2O$ equivalent |
| $K_2CO_3 = K_2O + CO_2$ | 1 mole of potassium carbonate = 1 mole of $K_2O$ equivalent |
| NaF | 1 mole of NaF = 1 mole of sodium and thus ½ mole of $Na_2O$ qquivalent |
| KF | 1 mole de KF = 1 mole of potassium and thus ½ mole of $K_2O$ equivalent |

In embodiments, the equivalent $Na_2O:K_2O$ molar ratio is from about 0.4 to about 2.0, or about 0.4 to about 1.9, or about 0.4 to about 1.8, or about 0.4 to about 1.7, or about 0.4 to about 1.6, or about 0.4 to about 1.5, or about 0.4 to about 1.4, or about 0.4 to about 1.3, or about 0.4 to about 1.2, or about 0.4 to about 1.1, or about 0.4 to about 1.0, or about 0.4 to about 0.9, or about 0.4 to about 0.8, or about 0.4 to about 0.7, or about 0.4 to about 0.6, or about 0.4 to about 0.5, or about 0.5 to about 2.0, or about 0.5 to about 1.9, or about 0.5 to about 1.8, or about 0.5 to about 1.7, or about 0.5 to about 1.6, or about 0.5 to about 1.5, or about 0.5 to about 1.4, or about 0.5 to about 1.3, or about 0.5 to about 1.2, or about 0.5 to about 1.1, or about 0.5 to about 1.0, or about 0.5 to about 0.9, or about 0.5 to about 0.8, or about 0.5 to about 0.7, or about 0.5 to about 0.6, or from about 0.6 to about 2.0, or about 0.6 to about 1.9, or about 0.6 to about 1.8, or about 0.6 to about 1.7, or about 0.6 to about 1.6, or about 0.6 to about 1.5, or about 0.6 to about 1.4, or about 0.6 to about 1.3, or about 0.6 to about 1.2, or about 0.6 to about 1.1, or about 0.6 to about 1.0, or about 0.6 to about 0.9, or about 0.6 to about 0.8, or about 0.6 to about 0.7, or from about 0.7 to about 2.0, or about 0.7 to about 1.9, or about 0.7 to about 1.8, or about 0.7 to about 1.7, or about 0.7 to about 1.6, or about 0.7 to about 1.5, or about 0.7 to about 1.4, or about 0.7 to about 1.3, or about 0.7 to about 1.2, or about 0.7 to about 1.1, or about 0.7 to about 1.0, or about 0.7 to about 0.9, or about 0.7 to about 0.8, or from about 0.7 to about 2.0, or about 0.7 to about 1.9, or about 0.7 to about 1.8, or about 0.7 to about 1.7, or about 0.7 to about 1.6, or about 0.7 to about 1.5, or about 0.7 to about 1.4, or about 0.7 to about 1.3, or about 0.7 to about 1.2, or about 0.7 to about 1.1, or about 0.7 to about 1.0, or about 0.7 to about 0.9, or from about 0.7 to about 2.0, or about 0.7 to about 1.9, or about 0.7 to about 1.8, or about 0.7 to about 1.7, or about 0.7 to about 1.6, or about 0.7 to about 1.5, or about 0.7 to about 1.4, or about 0.7 to about 1.3, or about 0.7 to about 1.2, or about 0.7 to about 1.1, or about 0.7 to about 1.0, or about 0.7 to about 0.9, or from about 0.7 to about 2.0, or about 0.7 to about 1.9, or about 0.7 to about 1.8, or about 0.7 to about 1.7, or about 0.7 to about 1.6, or about 0.7 to about 1.5, or about 0.7 to about 1.4, or about 0.7 to about 1.3, or about 0.7 to about 1.2, or about 0.7 to about 1.1, or about 0.7 to about 1.0, or about 0.7 to about 0.9, or from about 0.8 to about 2.0, or about 0.8 to about 1.9, or about 0.8 to about 1.8, or about 0.8 to about 1.7, or about 0.8 to about 1.6, or about 0.8 to about 1.5, or about 0.8 to about 1.4, or about 0.8 to about 1.3, or about 0.8 to about 1.2, or about 0.8 to about 1.1, or about 0.8 to about 1.0, or about 0.8 to about 0.9, or from about 0.9 to about 2.0, or about 0.9 to about 1.9, or about 0.9 to about 1.8, or about 0.9 to about 1.7, or about 0.9 to about 1.6, or about 0.9 to about 1.5, or about 0.9 to about 1.4, or about 0.9 to about 1.3, or about 0.9 to about 1.2, or about 0.9 to about 1.1, or about 0.9 to about 1.0, or from about 1.0 to about 2.0, or about 1.0 to about 1.9, or about 1.0 to about 1.8, or about 1.0 to about 1.7, or about 1.0 to about 1.6, or about 1.0 to about 1.5, or about 1.0 to about 1.4, or about 1.0 to about 1.3, or about 1.0 to about 1.2, or about 1.0 to about 1.1, or from about 1.1 to about 2.0, or about 1.1 to about 1.9, or about 1.1 to about 1.8, or about 1.1 to about 1.7, or about 1.1 to about 1.6, or about 1.1 to about 1.5, or about 1.1 to about 1.4, or about 1.1 to about 1.3, or about 1.1 to about 1.2, or from about 1.2 to about 2.0, or about 1.2 to about 1.9, or about 1.2 to about 1.8, or about 1.2 to about 1.7, or about 1.2 to about 1.6, or about 1.2 to about 1.5, or about 1.2 to about 1.4, or about 1.2 to about 1.3, or from about 1.3 to about 2.0, or about 1.3 to about 1.9, or about 1.3 to about 1.8, or about 1.3 to about 1.7, or about 1.3 to about 1.6, or about 1.3 to about 1.5, or about 1.3 to about 1.4, or from about 1.4 to about 2.0, or about 1.4 to about 1.9, or about 1.4 to about 1.8, or about 1.4 to about 1.7, or about 1.4 to about 1.6, or about 1.4 to about 1.5, or from about 1.5 to about 2.0, or about 1.5 to about 1.9, or about 1.5 to about 1.8, or about 1.5 to about 1.7, or about 1.5 to about 1.6, or from about 1.6 to about 2.0, or about 1.6 to about 1.9, or about 1.6 to about 1.8, or about 1.6 to about 1.7, or from about 1.7 to about 2.0, or about 1.7 to about 1.9, or about 1.7 to about 1.8, or from about 1.8 to about 2.0, or about 1.8 to about 1.9, or from about 1.9 to about 2.0, or about 0.5, 0.6, 0.7, 0.8, 0.9, 1.0, 1.1, 1.2, 1.3, 1.4, 1.5, 1.6, 1.7, 1.8, 1.9, or 2.0. Such aqueous coatings comprising the sodium salts and potassium salts of carbonate, such as $Na_2CO_3$, $K_2CO_3$, and in the indicated equivalent molar ratio display melting temperatures that may be up to 600° C., such that they can prevent and/or reduce air oxidation from that temperature and above.

According to another embodiment, this invention concerns the formulation of a water paint which may be made from a mixture sodium salts of carbonate, potassium salts of carbonate, and lithium salts. The sodium salt of carbonate and a potassium salt of carbonate are mixed in quantities that provide an equivalent $Na_2O:K_2O$ molar ratio of about 0.4 to about 1.8, to provide an aqueous coating having a melting temperature of between about 370° C. and 430° C., and preferably about 400° C. In these embodiments, the combination of the sodium salt of carbonate and the potassium salt of carbonate provide an equivalent $Na_2O:K_2O$ molar ratio varying between about 0.4 to about 1.8, or from about 0.4 to about 1.7, or from about 0.4 to about 1.6, or from about 0.4 to about 1.5, or from about 0.4 to about 1.4, or from about 0.4 to about 1.3, or from about 0.4 to about 1.2, or from about 0.4 to about 1.0, or from about 0.4 to about 0.9, or from about 0.4 to about 0.8, or from about 0.4 to about 0.7, or from about 0.4 to about 0.6, or from about 0.4 to about 0.5, or from about 0.5 to about 1.8, or from about 0.5 to about 1.7, or from about 0.5 to about 1.6, or from about 0.5 to about 1.5, or from about 0.5 to about 1.4, or from about 0.5 to about 1.3, or from about 0.5 to about 1.2, or from about 0.5 to about 1.0, or from about 0.5 to about 0.9, or from about 0.5 to about 0.8, or from about 0.5 to about 0.7, or from about 0.5 to about 0.6, or from about 0.6 to about 1.8, or from about 0.6 to about 1.7, or from about 0.6 to about 1.6, or from about 0.6 to about 1.5, or from about 0.6 to about 1.4, or from about 0.6 to about 1.3, or from about 0.6 to about 1.2, or from about 0.6 to about 1.0, or from about 0.6 to about 0.9, or from about 0.6 to about 0.8, or from about 0.6 to about 0.7, or from about 0.7 to about 1.8, or from about 0.7 to about 1.7, or from about 0.7 to about 1.6, or from about 0.7 to about 1.5, or from about 0.7 to about 1.4, or from about 0.7 to about 1.3, or from about 0.7 to about 1.2, or from about 0.7 to about 1.0, or from about 0.7 to about 0.9, or from about 0.7 to about 0.8, or from about 0.8 to about 1.8, or from about 0.8 to about 1.7, or from about 0.8 to about 1.6, or from about 0.8 to about 1.5, or from about 0.8 to about 1.4, or from about 0.8 to about 1.3, or from about 0.8 to about 1.2, or from about 0.8 to about 1.0, or from about 0.8 to about 0.9, or from about 0.9 to about 1.8, or from about 0.9 to about 1.7, or from about 0.9 to about 1.6, or from about 0.9 to about 1.5, or from about 0.9 to about 1.4, or from about 0.9 to about 1.3, or from about 0.9 to about 1.2, or from about 0.9 to about 1.0, or from about 1.0 to about 1.8, or from about 1.0 to about 1.7, or from about 1.0 to about 1.6, or from about 1.0 to about 1.5, or from about 1.0 to about 1.4, or from about 1.0 to about 1.3, or from about 1.0 to about 1.2, or from about 1.1 to about 1.8, or from about 1.1 to about 1.7, or from about 1.1 to about 1.6, or from about 1.1 to about 1.5, or from about 1.1 to about 1.4, or from about 1.1 to about 1.3, or from about 1.2 to about 1.8, or from about 1.2 to about 1.7, or from about 1.2 to about 1.6, or from about 1.2 to about 1.5, or from about 1.2 to about 1.4, or from about 1.2 to about 1.3, or from about 1.3 to about 1.8, or from about 1.3 to about 1.7, or from about 1.3 to about 1.6, or from about 1.3 to about 1.5, or from about 1.3 to about 1.4, or from about 1.4 to about 1.8, or from about 1.4 to about 1.7, or from about 1.4 to about 1.6, or from about 1.4 to about 1.5, or from about 1.5 to about 1.8, or from about 1.5 to about 1.7, or from about 1.5 to about 1.6, or from about 1.6 to about 1.8, or from about 1.6 to about 1.7, or from about 1.7 to about 1.8, or about 0.4, 0.5, 0.6, 0.7, 0.8, 0.9, 1.0, 1.1, 1.2, 1.3, 1.4, 1.5, 1.6, 1.7, and 1.8. Such aqueous coatings comprising the sodium salts and potassium salts of carbonate, such as $Na_2CO_3$, $K_2CO_3$, in the indicated equivalent molar ratio, and the lithium salt, such as $Li_2CO_3$, display melting temperatures that may be between about 370° C. and 430° C., and preferably about 400° C., such that they can prevent and/or reduce air oxidation from that temperature and above.

Therefore, in embodiments of the present invention, the sodium salt of carbonate may be selected from the group consisting of sodium carbonate ($Na_2CO_3$), and sodium bicarbonate ($NaHCO_3$), and combinations thereof. The potassium salt of carbonate may be selected from the group consisting of potassium carbonate ($K_2CO_3$), and potassium bicarbonate ($KHCO_3$), and combinations thereof. In preferred embodiments, the combination of a sodium salt of carbonate and a potassium salt of carbonate is a combination of sodium carbonate and potassium carbonate. In another preferred embodiments, the combination of a sodium salt of carbonate and a potassium salt of carbonate is a combination of sodium bicarbonate and potassium bicarbonate.

According to some embodiments, the concentration of sodium carbonate may be from about 7% to about 17% w/w, or from about 7% to about 16% w/w, or from about 7% to about 15% w/w, or from about 7% to about 14% w/w, or from about 7% to about 13% w/w, or from about 7% to about 12% w/w, or from about 7% to about 11% w/w, or from about 7% to about 10% w/w, or from about 7% to about 9% w/w, or from about 7% to about 8% w/w, or 8% to about 17% w/w, or from about 8% to about 16% w/w, or from about 8% to about 15% w/w, or from about 8% to about 14% w/w, or from about 8% to about 13% w/w, or from about 8% to about 12% w/w, or from about 8% to about 11% w/w, or from about 8% to about 10% w/w, or from about 8% to about 9% w/w, or 9% to about 17% w/w, or from about 9% to about 16% w/w, or from about 9% to about 15% w/w, or from about 9% to about 14% w/w, or from about 9% to about 13% w/w, or from about 9% to about 12% w/w, or from about 9% to about 11% w/w, or from about 9% to about 10% w/w, or 10% to about 17% w/w, or from about 10% to about 16% w/w, or from about 10% to about 15% w/w, or from about 10% to about 14% w/w, or from about 10% to about 13% w/w, or from about 10% to about 12% w/w, or from about 10% to about 11% w/w, or 11% to about 17% w/w, or from about 11% to about 16% w/w, or from about 11% to about 15% w/w, or from about 11% to about 14% w/w, or from about 11% to about 13% w/w, or from about 11% to about 12% w/w, or 12% to about 17% w/w, or from about 12% to about 16% w/w, or from about 12% to about 15% w/w, or from about 12% to about 14% w/w, or from about 12% to about 13% w/w, or 13% to about 17% w/w, or from about 13% to about 16% w/w, or from about 13% to about 15% w/w, or from about 13% to about 14% w/w, or 14% to about 17% w/w, or from about 14% to about 16% w/w, or from about 14% to about 15% w/w, or 15% to about 17% w/w, or from about 15% to about 16% w/w, or 16% to about 17% w/w, or about 7%, 8%, 9%, 10%, 11%, 12%, 13%, 14%, 15%, 16%, 17%, or about 12.75%, or about 13.59% w/w of the aqueous coating composition.

According to another embodiment, the concentration of sodium bicarbonate may be from about 11% to about 31% w/w, or from about 11% to about 30% w/w, or from about 11% to about 29% w/w, or from about 11% to about 28% w/w, or from about 11% to about 27% w/w, or from about 11% to about 26% w/w, or from about 11% to about 25% w/w, or from about 11% to about 24% w/w, or from about 11% to about 23% w/w, or from about 11% to about 22% w/w, or from about 11% to about 21% w/w, or from about 11% to about 20% w/w, or from about 11% to about 19% w/w, or from about 11% to about 18% w/w, or from about 11% to about 17% w/w, or from about 11% to about 16% w/w, or from about 11% to about 15% w/w, or from about 11% to about 14% w/w, or from about 11% to about 13% w/w, or from about 11% to about 12% w/w, or from about 12% to about 31% w/w, or from about 12% to about 30% w/w, or from about 12% to about 29% w/w, or from about 12% to about 28% w/w, or from about 12% to about 27% w/w, or from about 12% to about 26% w/w, or from about 12% to about 25% w/w, or from about 12% to about 24% w/w, or from about 12% to about 23% w/w, or from about 12% to about 22% w/w, or from about 12% to about 21% w/w, or from about 12% to about 20% w/w, or from about 12% to about 19% w/w, or from about 12% to about 18% w/w, or from about 12% to about 17% w/w, or from about 12% to about 16% w/w, or from about 12% to about 15% w/w, or from about 12% to about 14% w/w, or from about 12% to about 13% w/w, or from about 13% to about 31% w/w, or from about 13% to about 30% w/w, or from about 13% to about 29% w/w, or from about 13% to about 28% w/w, or from about 13% to about 27% w/w, or from about 13% to about 26% w/w, or from about 13% to about 25% w/w, or from about 13% to about 24% w/w, or from about 13% to about 23% w/w, or from about 13% to about 22% w/w, or from about 13% to about 21% w/w, or from about 13% to about 20% w/w, or from about 13% to about 19% w/w, or from about 13% to about 18% w/w, or from about 13% to about 17% w/w, or from about 13% to about 16% w/w, or from about 13% to about 15% w/w, or from about 13% to about 14% w/w, or from about 14% to about 31% w/w, or from about 14% to about 30% w/w, or from about 14% to about 29% w/w, or from about 14% to about 28% w/w, or from about 14% to about 27% w/w, or from about 14% to about 26% w/w, or from about 14% to about 25% w/w, or from about 14% to about 24% w/w, or from about 14% to about 23% w/w, or from about 14% to about 22% w/w, or from about 14% to about 21% w/w, or from about 14% to about 20% w/w, or from about 14% to about 19% w/w, or from about 14% to about 18% w/w, or from about 14% to about 17% w/w, or from about 14% to about 16% w/w, or from about 14% to about 15% w/w, or from about 15% to about 31% w/w, or from about 15% to about 30% w/w, or from about 15% to about 29% w/w, or from about 15% to about 28% w/w, or from about 15% to about 27% w/w, or from about 15% to about 26% w/w, or from about 15% to about 25% w/w, or from about 15% to about 24% w/w, or from about 15% to about 23% w/w, or from about 15% to about 22% w/w, or from about 15% to about 21% w/w, or from about 15% to about 20% w/w, or from about 15% to about 19% w/w, or from about 15% to about 18% w/w, or from about 15% to about 17% w/w, or from about 15% to about 16% w/w, or from about 16% to about 31% w/w, or from about 16% to about 30% w/w, or from about 16% to about 29% w/w, or from about 16% to about 28% w/w, or from about 16% to about 27% w/w, or from about 16% to about 26% w/w, or from about 16% to about 25% w/w, or from about 16% to about 24% w/w, or from about 16% to about 23% w/w, or from about 16% to about 22% w/w, or from about 16% to about 21% w/w, or from about 16% to about 20% w/w, or from about 16% to about 19% w/w, or from about 16% to about 18% w/w, or from about 16% to about 17% w/w, or from about 17% to about 31% w/w, or from about 17% to about 30% w/w, or from about 17% to about 29% w/w, or from about 17% to about 28% w/w, or from about 17% to about 27% w/w, or from about 17% to about 26% w/w, or from about 17% to about 25% w/w, or from about 17% to about 24% w/w, or from about 17% to about 23% w/w, or from about 17% to about 22% w/w, or from about 17% to about 21% w/w, or from about 17% to about 20% w/w, or from about 17% to about 19% w/w, or from about 17% to about 18% w/w, or from about 18% to about 31% w/w, or from about 18% to about 30% w/w, or from about 18% to about 29% w/w, or from about 18% to about 28% w/w, or from about 18% to about 27% w/w, or from about 18% to about 26% w/w, or from about 18% to about 25% w/w, or from about 18% to about 24% w/w, or from about 18% to about 23% w/w, or from about 18% to about 22% w/w, or from about 18% to about 21% w/w, or from about 18% to about 20% w/w, or from about 18% to about 19% w/w, or from about 19% to about 31% w/w, or from about 19% to about 30% w/w, or from about 19% to about 29% w/w, or from about 19% to about 28% w/w, or from about 19% to about 27% w/w, or from about 19% to about 26% w/w, or from about 19% to about 25% w/w, or from about 19% to about 24% w/w, or from about 19% to about 23% w/w, or from about 19% to about 22% w/w, or from about 19% to about 21% w/w, or from about 19% to about 20% w/w, or from about 20% to about 31% w/w, or from about 20% to about 30% w/w, or from about 20% to about 29% w/w, or from about 20% to about 28% w/w, or from about 20% to about 27% w/w, or from about 20% to about 26% w/w, or from about 20% to about 25% w/w, or from about 20% to about 24% w/w, or from about 20% to about 23% w/w, or from about 20% to about 22% w/w, or from about 20% to about 21% w/w, or from about 21% to about 31% w/w, or from about 21% to about 30% w/w, or from about 21% to about 29% w/w, or from about 21% to about 28% w/w, or from about 21% to about 27% w/w, or from about 21% to about 26% w/w, or from about 21% to about 25% w/w, or from about 21% to about 24% w/w, or from about 21% to about 23% w/w, or from about 21% to about 22% w/w, or from about 22% to about 31% w/w, or from about 22% to about 30% w/w, or from about 22% to about 29% w/w, or from about 22% to about 28% w/w, or from about 22% to about 27% w/w, or from about 22% to about 26% w/w, or from about 22% to about 25% w/w, or from about 22% to about 24% w/w, or from about 22% to about 23% w/w, or from about 23% to about 31% w/w, or from about 23% to about 30% w/w, or from about 23% to about 29% w/w, or from about 23% to about 28% w/w, or from about 23% to about 27% w/w, or from about 23% to about 26% w/w, or from about 23% to about 25% w/w, or from about 23% to about 24% w/w, or from about 24% to about 31% w/w, or from about 24% to about 30% w/w, or from about 24% to about 29% w/w, or from about 24% to about 28% w/w, or from about 24% to about 27% w/w, or from about 24% to about 26% w/w, or from about 24% to about 25% w/w, or from about 25% to about 31% w/w, or from about 25% to about 30% w/w, or from about 25% to about 29% w/w, or from about 25% to about 28% w/w, or from about 25% to about 27% w/w, or from about 25% to about 26% w/w, or from about 26% to about 31% w/w, or from about 26% to about 30% w/w, or from about 26% to about 29% w/w, or from about 26% to about 28% w/w, or from about 26% to about 27% w/w, or from about 27% to about 31% w/w, or from about 27% to about 30% w/w, or from about 27% to about 29% w/w, or from about 27% to about 28% w/w, or from about 28% to about 31% w/w, or from about 28% to about 30% w/w, or from about 28% to about 29% w/w, or from about 29% to about 31% w/w, or from about 29% to about 30% w/w, or from about 30% to about 31% w/w, or about 11%, 12%, 13%, 14%, 15%, 16%, 17%, 18%, 19%, 20%, 21%, 22%, 23%, 24%, 25%, 26%, 27%, 28%, 29%, 30%, 31%, or about 21.68% w/w, of the aqueous coating composition.

According to another embodiment, the concentration of potassium carbonate may be from about 15% to about 25% w/w, or from about 15% to about 24% w/w, or from 15% to about 23% w/w, or from about 15% to about 22% w/w, or from about 15% to about 21% w/w, or from about 15% to about 20% w/w, or from about 15% to about 19% w/w, or from about 15% to about 18% w/w, or from about 15% to about 17% w/w, or from about 15% to about 16% w/w, or from about 16% to about 25% w/w, or from about 16% to about 24% w/w, or from about 16% to about 23% w/w, or from about 16% to about 22% w/w, or from about 16% to about 21% w/w, or from about 16% to about 20% w/w, or from about 16% to about 19% w/w, or from about 16% to about 18% w/w, or from about 16% to about 17% w/w, or from about 17% to about 25% w/w, or from about 17% to about 24% w/w, or from about 17% to about 23% w/w, or from about 17% to about 22% w/w, or from about 17% to about 21% w/w, or from about 17% to about 20% w/w, or from about 17% to about 19% w/w, or from about 17% to about 18% w/w, or from about 18% to about 25% w/w, or from about 18% to about 24% w/w, or from about 18% to about 23% w/w, or from about 18% to about 22% w/w, or from about 18% to about 21% w/w, or from about 18% to about 20% w/w, or from about 18% to about 19% w/w, or from about 19% to about 25% w/w, or from about 19% to about 24% w/w, or from about 19% to about 23% w/w, or from about 19% to about 22% w/w, or from about 19% to about 21% w/w, or from about 19% to about 20% w/w, or from about 20% to about 25% w/w, or from about 20% to about 24% w/w, or from about 20% to about 23% w/w, or from about 20% to about 22% w/w, or from about 20% to about 21% w/w, or from about 21% to about 25% w/w, or from about 21% to about 24% w/w, or from about 21% to about 23% w/w, or from about 21% to about 22% w/w, or from about 22% to about 25% w/w, or from about 22% to about 24% w/w, or from about 22% to about 23% w/w, or from about 23% to about 25% w/w, or from about 23% to about 24% w/w, or from about 24% to about 25% w/w, or about 15%, 16%, 17%, 18%, 19%, 20%, 21%, 22%, 23%, 24%, 25%, or about 20.32% or about 21.67% w/w of the aqueous coating composition.

According to another embodiment, the concentration of potassium bicarbonate may be from about 19% to about 43% w/w, or from about 19% to about 42% w/w, or from about 19% to about 41% w/w, or from about 19% to about 40% w/w, or from about 19% to about 39% w/w, or from about 19% to about 38% w/w, or from about 19% to about 37% w/w, or from about 19% to about 36% w/w, or from about 19% to about 35% w/w, or from about 19% to about 34% w/w, or from about 19% to about 33% w/w, or from about 19% to about 32% w/w, or from about 19% to about 31% w/w, or from about 19% to about 30% w/w, or from about 19% to about 29% w/w, or from about 19% to about 28% w/w, or from about 19% to about 27% w/w, or from about 19% to about 26% w/w, or from about 19% to about 25% w/w, or from about 19% to about 24% w/w, or from about 19% to about 23% w/w, or from about 19% to about 22% w/w, or from about 19% to about 21% w/w, or from about 19% to about 20% w/w, or from about 20% to about 43% w/w, or from about 20% to about 42% w/w, or from about 20% to about 41% w/w, or from about 20% to about 40% w/w, or from about 20% to about 39% w/w, or from about 20% to about 38% w/w, or from about 20% to about 37% w/w, or from about 20% to about 36% w/w, or from about 20% to about 35% w/w, or from about 20% to about 34% w/w, or from about 20% to about 33% w/w, or from about 20% to about 32% w/w, or from about 20% to about 31% w/w, or from about 20% to about 30% w/w, or from about 20% to about 29% w/w, or from about 20% to about 28% w/w, or from about 20% to about 27% w/w, or from about 20% to about 26% w/w, or from about 20% to about 25% w/w, or from about 20% to about 24% w/w, or from about 20% to about 23% w/w, or from about 20% to about 22% w/w, or from about 20% to about 21% w/w, or from about 21% to about 43% w/w, or from about 21% to about 42% w/w, or from about 21% to about 41% w/w, or from about 21% to about 40% w/w, or from about 21% to about 39% w/w, or from about 21% to about 38% w/w, or from about 21% to about 37% w/w, or from about 21% to about 36% w/w, or from about 21% to about 35% w/w, or from about 21% to about 34% w/w, or from about 21% to about 33% w/w, or from about 21% to about 32% w/w, or from about 21% to about 31% w/w, or from about 21% to about 30% w/w, or from about 21% to about 29% w/w, or from about 21% to about 28% w/w, or from about 21% to about 27% w/w, or from about 21% to about 26% w/w, or from about 21% to about 25% w/w, or from about 21% to about 24% w/w, or from about 21% to about 23% w/w, or from about 21% to about 22% w/w, or from about 22% to about 43% w/w, or from about 22% to about 42% w/w, or from about 22% to about 41% w/w, or from about 22% to about 40% w/w, or from about 22% to about 39% w/w, or from about 22% to about 38% w/w, or from about 22% to about 37% w/w, or from about 22% to about 36% w/w, or from about 22% to about 35% w/w, or from about 22% to about 34% w/w, or from about 22% to about 33% w/w, or from about 22% to about 32% w/w, or from about 22% to about 31% w/w, or from about 22% to about 30% w/w, or from about 22% to about 29% w/w, or from about 22% to about 28% w/w, or from about 22% to about 27% w/w, or from about 22% to about 26% w/w, or from about 22% to about 25% w/w, or from about 22% to about 24% w/w, or from about 22% to about 23% w/w, or from about 23% to about 43% w/w, or from about 23% to about 42% w/w, or from about 23% to about 41% w/w, or from about 23% to about 40% w/w, or from about 23% to about 39% w/w, or from about 23% to about 38% w/w, or from about 23% to about 37% w/w, or from about 23% to about 36% w/w, or from about 23% to about 35% w/w, or from about 23% to about 34% w/w, or from about 23% to about 33% w/w, or from about 23% to about 32% w/w, or from about 23% to about 31% w/w, or from about 23% to about 30% w/w, or from about 23% to about 29% w/w, or from about 23% to about 28% w/w, or from about 23% to about 27% w/w, or from about 23% to about 26% w/w, or from about 23% to about 25% w/w, or from about 23% to about 24% w/w, or from about 24% to about 43% w/w, or from about 24% to about 42% w/w, or from about 24% to about 41% w/w, or from about 24% to about 40% w/w, or from about 24% to about 39% w/w, or from about 24% to about 38% w/w, or from about 24% to about 37% w/w, or from about 24% to about 36% w/w, or from about 24% to about 35% w/w, or from about 24% to about 34% w/w, or from about 24% to about 33% w/w, or from about 24% to about 32% w/w, or from about 24% to about 31% w/w, or from about 24% to about 30% w/w, or from about 24% to about 29% w/w, or from about 24% to about 28% w/w, or from about 24% to about 27% w/w, or from about 24% to about 26% w/w, or from about 24% to about 25% w/w, or from about 25% to about 43% w/w, or from about 25% to about 42% w/w, or from about 25% to about 41% w/w, or from about 25% to about 40% w/w, or from about 25% to about 39% w/w, or from about 25% to about 38% w/w, or from about 25% to about 37% w/w, or from about 25% to about 36% w/w, or from about 25% to about 35% w/w, or from about 25% to about 34% w/w, or from about 25% to about 33% w/w, or from about 25% to about 32% w/w, or from about 25% to about 31% w/w, or from about 25% to about 30% w/w, or from about 25% to about 29% w/w, or from about 25% to about 28% w/w, or from about 25% to about 27% w/w, or from about 25% to about 26% w/w, or from about 25% to about 43% w/w, or from about 25% to about 42% w/w, or from about 25% to about 41% w/w, or from about 25% to about 40% w/w, or from about 25% to about 39% w/w, or from about 25% to about 38% w/w, or from about 25% to about 37% w/w, or from about 25% to about 36% w/w, or from about 25% to about 35% w/w, or from about 25% to about 34% w/w, or from about 25% to about 33% w/w, or from about 25% to about 32% w/w, or from about 25% to about 31% w/w, or from about 25% to about 30% w/w, or from about 25% to about 29% w/w, or from about 25% to about 28% w/w, or from about 25% to about 27% w/w, or from about 26% to about 43% w/w, or from about 26% to about 42% w/w, or from about 26% to about 41% w/w, or from about 26% to about 40% w/w, or from about 26% to about 39% w/w, or from about 26% to about 38% w/w, or from about 26% to about 37% w/w, or from about 26% to about 36% w/w, or from about 26% to about 35% w/w, or from about 26% to about 34% w/w, or from about 26% to about 33% w/w, or from about 26% to about 32% w/w, or from about 26% to about 31% w/w, or from about 26% to about 30% w/w, or from about 26% to about 29% w/w, or from about 26% to about 28% w/w, or from about 27% to about 43% w/w, or from about 27% to about 42% w/w, or from about 27% to about 41% w/w, or from about 27% to about 40% w/w, or from about 27% to about 39% w/w, or from about 27% to about 38% w/w, or from about 27% to about 37% w/w, or from about 27% to about 36% w/w, or from about 27% to about 35% w/w, or from about 27% to about 34% w/w, or from about 27% to about 33% w/w, or from about 27% to about 32% w/w, or from about 27% to about 31% w/w, or from about 27% to about 30% w/w, or from about 27% to about 29% w/w, or from about 29% to about 43% w/w, or from about 29% to about 42% w/w, or from about 29% to about 41% w/w, or from about 29% to about 40% w/w, or from about 29% to about 39% w/w, or from about 29% to about 38% w/w, or from about 29% to about 37% w/w, or from about 29% to about 36% w/w, or from about 29% to about 35% w/w, or from about 29% to about 34% w/w, or from about 29% to about 33% w/w, or from about 29% to about 32% w/w, or from about 29% to about 31% w/w, or from about 29% to about 30% w/w, or from about 30% to about 43% w/w, or from about 30% to about 42% w/w, or from about 30% to about 41% w/w, or from about 30% to about 40% w/w, or from about 30% to about 39% w/w, or from about 30% to about 38% w/w, or from about 30% to about 37% w/w, or from about 30% to about 36% w/w, or from about 30% to about 35% w/w, or from about 30% to about 34% w/w, or from about 30% to about 33% w/w, or from about 30% to about 32% w/w, or from about 30% to about 31% w/w, or from about 31% to about 43% w/w, or from about 31% to about 42% w/w, or from about 31% to about 41% w/w, or from about 31% to about 40% w/w, or from about 31% to about 39% w/w, or from about 31% to about 38% w/w, or from about 31% to about 37% w/w, or from about 31% to about 36% w/w, or from about 31% to about 35% w/w, or from about 31% to about 34% w/w, or from about 31% to about 33% w/w, or from about 31% to about 32% w/w, or from about 32% to about 43% w/w, or from about 32% to about 42% w/w, or from about 32% to about 41% w/w, or from about 32% to about 40% w/w, or from about 32% to about 39% w/w, or from about 32% to about 38% w/w, or from about 32% to about 37% w/w, or from about 32% to about 36% w/w, or from about 32% to about 35% w/w, or from about 32% to about 34% w/w, or from about 32% to about 33% w/w, or from about 33% to about 43% w/w, or from about 33% to about 42% w/w, or from about 33% to about 41% w/w, or from about 33% to about 40% w/w, or from about 33% to about 39% w/w, or from about 33% to about 38% w/w, or from about 33% to about 37% w/w, or from about 33% to about 36% w/w, or from about 33% to about 35% w/w, or from about 33% to about 34% w/w, or from about 34% to about 43% w/w, or from about 34% to about 42% w/w, or from about 34% to about 41% w/w, or from about 34% to about 40% w/w, or from about 34% to about 39% w/w, or from about 34% to about 38% w/w, or from about 34% to about 37% w/w, or from about 34% to about 36% w/w, or from about 34% to about 35% w/w, or from about 35% to about 43% w/w, or from about 35% to about 42% w/w, or from about 35% to about 41% w/w, or from about 35% to about 40% w/w, or from about 35% to about 39% w/w, or from about 35% to about 38% w/w, or from about 35% to about 37% w/w, or from about 35% to about 36% w/w, or from about 36% to about 43% w/w, or from about 36% to about 42% w/w, or from about 36% to about 41% w/w, or from about 36% to about 40% w/w, or from about 36% to about 39% w/w, or from about 36% to about 38% w/w, or from about 36% to about 37% w/w, or from about 37% to about 43% w/w, or from about 37% to about 42% w/w, or from about 37% to about 41% w/w, or from about 37% to about 40% w/w, or from about 37% to about 39% w/w, or from about 37% to about 38% w/w, or from about 38% to about 43% w/w, or from about 38% to about 42% w/w, or from about 38% to about 41% w/w, or from about 38% to about 40% w/w, or from about 38% to about 39% w/w, or from about 39% to about 43% w/w, or from about 39% to about 42% w/w, or from about 39% to about 41% w/w, or from about 39% to about 40% w/w, or from about 40% to about 43% w/w, or from about 40% to about 42% w/w, or from about 40% to about 41% w/w, or from about 41% to about 43% w/w, or from about 41% to about 42% w/w, or from about 42% to about 43% w/w, or 19%, 20%, 21%, 22%, 23%, 24%, 25%, 26%, 27%, 28%, 29%, 30%, 31%, 32%, 33%, 34%, 35%, 36%, 37%, 38%, 39%, 40%, 41%, 42%, 43%, or 31.58% w/w of the aqueous coating composition.

According to embodiments, the equivalent Li$_2$O molar content should be between about 17% and about 74% of the composition. The equivalent Li$_2$O molar content may be provided from a lithium salt which may be selected from the group consisting of lithium carbonate (Li$_2$CO$_3$), lithium bicarbonate (LiHCO$_3$), LiF, a mixture of LiF and NaF, and combination of all of the above.

The equivalent molar ratio for lithium salts may be derived according to the following:

| Reaction | Molar equivalent |
|---|---|
| Li$_2$CO$_3$ = Li$_2$O + CO$_2$ | 1 mole de Li$_2$CO$_3$ = 2 moles of Lithium and thus 1 mole de Li$_2$O equivalent |
| 2LiHCO$_3$ = Li$_2$O + 2CO$_2$ + H$_2$O | 2 moles de LiHCO$_3$ = 1 mole de Li$_2$O equivalent |
| LIF | 1 mole de LiF = 1 mole de lithium and thus ½ mole de Li$_2$O equivalent |

The equivalent Li$_2$O molar content may be from about 17% to about 74% of the composition, or from about 20% to about 74%, or from about 25% to about 74%, or from about 30% to about 74%, or from about 35% to about 74%, or from about 40% to about 74%, or from about 45% to about 74%, or from about 50% to about 74%, or from about 55% to about 74%, or from about 60% to about 74%, or from about 65% to about 74%, or from about 70% to about 74%, or from 17% to about 70%, or from about 20% to about 70%, or from about 25% to about 70%, or from about 30% to about 70%, or from about 35% to about 70%, or from about 40% to about 70%, or from about 45% to about 70%, or from about 50% to about 70%, or from about 55% to about 70%, or from about 60% to about 70%, or from about 65% to about 70%, or from 17% to about 65%, or from about 20% to about 65%, or from about 25% to about 65%, or from about 30% to about 70%, or from about 35% to about 65%, or from about 40% to about 65%, or from about 45% to about 65%, or from about 50% to about 65%, or from about 55% to about 65%, or from about 60% to about 65%, or from 17% to about 60%, or from about 20% to about 60%, or from about 25% to about 60%, or from about 30% to about 60%, or from about 35% to about 60%, or from about 40% to about 60%, or from about 45% to about 60%, or from about 50% to about 60%, or from about 55% to about 60%, or from 17% to about 55%, or from about 20% to about 55%, or from about 25% to about 55%, or from about 30% to about 55%, or from about 35% to about 55%, or from about 40% to about 55%, or from about 45% to about 55%, or from about 50% to about 55%, or from 17% to about 50%, or from about 20% to about 50%, or from about 25% to about 50%, or from about 30% to about 50%, or from about 35% to about 50%, or from about 40% to about 50%, or from about 45% to about 50%, or from 17% to about 45%, or from about 20% to about 45%, or from about 25% to about 45%, or from about 30% to about 45%, or from about 35% to about 45%, or from about 40% to about 45%, or from 17% to about 40%, or from about 20% to about 40%, or from about 25% to about 40%, or from about 30% to about 40%, or from about 35% to about 40%, or from 17% to about 35%, or from about 20% to about 35%, or from about 25% to about 35%, or from about 30% to about 35%, or from 17% to about 30%, or from about 20% to about 30%, or from about 25% to about 30%, or from 17% to about 25%, or from about 20% to about 25%, or from 17% to about 20%, or 17%, 20%, 25%, 30%, 35%, 40%, 45%, 50%, 55%, 60%, 65%, 70%, or 74% of the composition.

In a preferred embodiment, the lithium salt is lithium carbonate. In a preferred embodiment, the lithium carbonate may be in suspension in the aqueous coating composition. The lithium carbonate may be any powdered form of lithium carbonate. However, smaller particles may be used in order to favor the homogeneity of the suspension. For example, nano-sized particles of lithium carbonate may be used to obtain stable suspensions.

Lithium bicarbonate may also be used in the composition of the present invention. It is however mostly available in solution form at maximum concentration of 5.39% w/w.

According to embodiments, the concentration of the lithium carbonate may be from about 8% to about 18% w/w, or from about 8% to about 17% w/w, or from about 8% to about 16% w/w, or from about 8% to about 15% w/w, or from about 8% to about 14% w/w, or from about 8% to about 13% w/w, or from about 8% to about 12% w/w, or from about 8% to about 11% w/w, or from about 8% to about 10% w/w, or from about 8% to about 9% w/w, or from about 9% to about 18% w/w, or from about 9% to about 17% w/w, or from about 9% to about 16% w/w, or from about 9% to about 15% w/w, or from about 9% to about 14% w/w, or from about 9% to about 13% w/w, or from about 9% to about 12% w/w, or from about 9% to about 11% w/w, or from about 9% to about 10% w/w, or from about 10% to about 18% w/w, or from about 10% to about 17% w/w, or from about 10% to about 16% w/w, or from about 10% to about 15% w/w, or from about 10% to about 14% w/w, or from about 10% to about 13% w/w, or from about 10% to about 12% w/w, or from about 10% to about 11% w/w, or from about 11% to about 18% w/w, or from about 11% to about 17% w/w, or from about 11% to about 16% w/w, or from about 11% to about 15% w/w, or from about 11% to about 14% w/w, or from about 11% to about 13% w/w, or from about 11% to about 12% w/w, or from about 12% to about 18% w/w, or from about 12% to about 17% w/w, or from about 12% to about 16% w/w, or from about 12% to about 15% w/w, or from about 12% to about 14% w/w, or from about 12% to about 13% w/w, or from about 13% to about 18% w/w, or from about 13% to about 17% w/w, or from about 13% to about 16% w/w, or from about 13% to about 15% w/w, or from about 13% to about 14% w/w, or from about 14% to about 18% w/w, or from about 14% to about 17% w/w, or from about 14% to about 16% w/w, or from about 14% to about 15% w/w, or from about 15% to about 18% w/w, or from about 15% to about 17% w/w, or from about 15% to about 16% w/w, or from about 16% to about 18% w/w, or from about 17% to about 17% w/w, or from about 17% to about 18% w/w, or 8%, 9%, 10%, 11%, 12%, 13%, 14%, 15%, 16%, 17%, 18%, or 13.83% to about 14.74% w/w, or 13.83% w/w, or 14.74% w/w of the aqueous coating composition.

According to another embodiment, the LiF or LiF mixed with NaF may be used as salts of lithium according to concentrations that provide the adequate equivalent $Li_2O$ molar content.

According to another embodiment, the aqueous coating of the present invention may further comprise a liquid binder. As used herein, the term "liquid binder" means a liquid or a colloidal suspension that can, bind at room temperature, following chemical transformations such as reactions, gelling or hydration, a set of particles. The latter, originally in the pulverulent state, are transformed by the action of the liquid binder into a rigid material (non-zero modulus of elasticity). The liquid binder may comprise colloidal silica, colloidal alumina, a deflocculant and combinations thereof.

In embodiments, the concentration of colloidal silica may be up to 5% w/w, or up to 4% w/w, or up to 3% w/w, or up to 2% w/w, or up to 1% w/w, or up to 0.5%, or from about 0.5% to about 5%, or from about 0.5% to about 4%, or from about 0.5% to about 3%, or from about 0.5% to about 2%, or from about 0.5% to about 1%, or from about 1% to about 5%, or from about 1% to about 4%, or from about 1% to about 3%, or from about 1% to about 2%, or from about 2% to about 5%, or from about 2% to about 4%, or from about 2% to about 3%, or from about 3% to about 5%, or from about 3% to about 4%, or from about 4% to about 5%, or about 0.5%, 1%, 2%, 3%, 4%, 5%, or 0.65% w/w of the aqueous coating composition.

In embodiments, the concentration of colloidal alumina may be up to 8% w/w, or up to 7% w/w, or up to 6% w/w, or up to 5% w/w, or up to 4% w/w, or up to 3% w/w, or up to 2% w/w, or up to 1% w/w, or up to 0.5%, or from about 0.5% to about 8%, or from about 0.5% to about 7%, or from about 0.5% to about 6%, or from about 0.5% to about 5%, or from about 0.5% to about 4%, or from about 0.5% to about 3%, or from about 0.5% to about 2%, or from about 0.5% to about 1%, or from about 1% to about 8%, or from about 1% to about 7%, or from about 1% to about 6%, or from about 1% to about 5%, or from about 1% to about 4%, or from about 1% to about 3%, or from about 1% to about 2%, or from about 2% to about 8%, or from about 2% to about 7%, or from about 2% to about 6%, or from about 2% to about 5%, or from about 2% to about 4%, or from about 2% to about 3%, or from about 3% to about 8%, or from about 3% to about 7%, or from about 3% to about 6%, or from about 3% to about 5%, or from about 3% to about 4%, or from about 4% to about 8%, or from about 4% to about 7%, or from about 4% to about 6%, or from about 4% to about 5%, or from about 5% to about 8%, or from about 5% to about 7%, or from about 5% to about 6%, or from about 6% to about 8%, or from about 6% to about 7%, or from about 7% to about 8%, or about 0.5%, 1%, 2%, 3%, 4%, 5%, 6%, 7%, 8%, or 5.55% w/w of the aqueous coating composition.

In embodiments, the liquid binder may also comprise a deflocculant, which is a compound that is added to the composition to minimize settling out, prevent flocculation and disperse the other ingredients, increase fluidity of the composition, and help form a colloid or suspension. The deflocculant may be selected from the group consisting of polyethylene glycol graft polymers, such as castament® FS10, FS20 or FS60.

In embodiments, the concentration of the deflocculant may be up to 6% w/w, or up to 5% w/w, or up to 4% w/w, or up to 3% w/w, or up to 2% w/w, or up to 1% w/w, or up to 0.5%, or from about 0.5% to about 6%, or from about 0.5% to about 5%, or from about 0.5% to about 4%, or from about 0.5% to about 3%, or from about 0.5% to about 2%, or from about 0.5% to about 1%, or from about 1% to about 6%, or from about 1% to about 5%, or from about 1% to about 4%, or from about 1% to about 3%, or from about 1% to about 2%, or from about 2% to about 6%, or from about 2% to about 5%, or from about 2% to about 4%, or from about 2% to about 3%, or from about 3% to about 6%, or from about 3% to about 5%, or from about 3% to about 4%, or from about 4% to about 6%, or from about 4% to about 5%, or from about 5% to about 6%, or about 0.5%, 1%, 2%, 3%, 4%, 5%, 6% w/w of the aqueous coating composition.

According to another embodiment, there is disclosed an aqueous priming coating composition for application to a carbon material which comprises a mixture of aluminum oxide ($Al_2O_3$), comprising a combination of aluminum oxide select from the group consisting of calcined aluminum oxide, reactive aluminum oxide, and white fused aluminum oxide; and water.

Carbon materials, such as carbon anodes, are not wetted by molten salts. The aqueous coating of the present invention is preferably applied on an intermediate substrate, such as a priming coating composition described herein. The priming coating composition of the present invention is a formulation of water-based paint (designated aqueous priming coating composition) that highly adheres mechanically on carbon materials, such as anodes, by filling their surface defects, such as open pores and microcracks or microfissures. This paint is preferably containing up to 94 to 96% w/w alumina—aluminum oxide—(on a dry basis). Colloidal binders may be included to act as substrate for the aqueous coating composition. During the application of the aqueous coating composition on the aqueous priming coating, the dissolved salts of sodium and potassium carbonate contained into the aqueous coating composition penetrate the open pores of the aqueous priming coating while most of the lithium salt of carbonate (e.g. $Li_2CO_3$) from the aqueous coating composition is accumulated on the aqueous priming coating surface. Due to the much lower solubility of the $NaHCO_3$ and $KHCO_3$ salts compared to $Na_2CO_3$ and $K_2CO_3$, respectively, a lesser degree of penetration into the aqueous priming coating is obtained with the alternative aqueous coating composition whose adherence is consequently lower, as it has been observed that it is easier to dislodge a coating made with bicarbonates.

In embodiments, the concentration of the calcined aluminum oxide may be from about 32% to 41% w/w, or from about 32% to 40% w/w, or from about 32% to 39% w/w, or from about 32% to 38% w/w, or from about 32% to 37% w/w, or from about 32% to 36% w/w, or from about 32% to 35% w/w, or from about 32% to 34% w/w, or from about 32% to 33% w/w, or from about 33% to 41% w/w, or from about 33% to 40% w/w, or from about 33% to 39% w/w, or from about 33% to 38% w/w, or from about 33% to 37% w/w, or from about 33% to 36% w/w, or from about 33% to 35% w/w, or from about 33% to 34% w/w, or from about 34% to 41% w/w, or from about 34% to 40% w/w, or from about 34% to 39% w/w, or from about 34% to 38% w/w, or from about 34% to 37% w/w, or from about 34% to 36% w/w, or from about 34% to 35% w/w, or from about 35% to 41% w/w, or from about 35% to 40% w/w, or from about 35% to 39% w/w, or from about 35% to 38% w/w, or from about 35% to 37% w/w, or from about 35% to 36% w/w, or from about 36% to 41% w/w, or from about 36% to 40% w/w, or from about 36% to 39% w/w, or from about 36% to 38% w/w, or from about 36% to 37% w/w, or from about 37% to 41% w/w, or from about 37% to 40% w/w, or from about 37% to 39% w/w, or from about 37% to 38% w/w, or from about 38% to 41% w/w, or from about 38% to 40% w/w, or from about 38% to 39% w/w, or from about 39% to 41% w/w, or from about 39% to 40% w/w, or is from about 35.29% to 38.07% w/w or from about 40% to 41% w/w, or about 31%, 32%, 33%, 34%, 35%, 36%, 37%, 38%, 39%, 40%, 41%, 35.29% or 38.07% w/w of the aqueous priming coating composition.

In embodiments, the concentration of reactive aluminum oxide may be from about 6% to 9% w/w, or from about 6% to 8% w/w, or from about 6% to 7% w/w, or from about 7% to 9% w/w, or from about 7% to 8% w/w, or from about 8% to 9% w/w, or from about 7.41% to 7.99% w/w or 6%, 7%, 8%, 9%, or 7.41% or 7.99% w/w of the aqueous priming coating composition.

In embodiments, the concentration of white fused aluminum oxide may be from about 31% to 40% w/w, or from about 31% to 39% w/w, or from about 31% to 38% w/w, or from about 31% to 37% w/w, or from about 31% to 36% w/w, or from about 31% to 35% w/w, or from about 31% to 34% w/w, or from about 31% to 33% w/w, or from about 31% to 32% w/w, or from about 32% to 40% w/w, or from about 32% to 39% w/w, or from about 32% to 38% w/w, or from about 32% to 37% w/w, or from about 32% to 36% w/w, or from about 32% to 35% w/w, or from about 32% to 34% w/w, or from about 32% to 33% w/w, or from about 33% to 40% w/w, or from about 33% to 39% w/w, or from about 33% to 38% w/w, or from about 33% to 37% w/w, or from about 33% to 36% w/w, or from about 33% to 35% w/w, or from about 33% to 34% w/w, or from about 34% to 40% w/w, or from about 34% to 39% w/w, or from about 34% to 38% w/w, or from about 34% to 37% w/w, or from about 34% to 36% w/w, or from about 34% to 35% w/w, or from about 35% to 40% w/w, or from about 35% to 39% w/w, or from about 35% to 38% w/w, or from about 35% to 37% w/w, or from about 35% to 36% w/w, or from about 36% to 40% w/w, or from about 36% to 39% w/w, or from about 36% to 38% w/w, or from about 36% to 37% w/w, or from about 37% to 40% w/w, or from about 37% to 39% w/w, or from about 37% to 38% w/w, or from about 38% to 40% w/w, or from about 38% to 39% w/w, or from about 39% to 40% w/w, or is from about 34.13% to 36.81% w/w, or about 31%, 32%, 33%, 34%, 35%, 36%, 37%, 38%, 39%, 40%, 34.13% or 36.81% w/w of the aqueous priming coating composition.

In embodiments, the white fused aluminum oxide may have particle size of up to about 0.2 mm and less (i.e., passing across the No. 70 ASTM Tyler Mesh screen).

In embodiments, the aqueous priming coating composition may further comprise a calcium salt of carbonate, and the calcium salt of carbonate may be selected from the group consisting of calcium carbonate ($CaCO_3$), calcium bicarbonate [$Ca(HCO_3)_2$], and combinations thereof.

In embodiments, the concentration of the calcium carbonate may be up to 5% w/w, or up to 4% w/w, or up to 3% w/w, or up to 2% w/w, or up to 1% w/w, or up to 0.5%, or from about 0.5% to about 5%, or from about 0.5% to about 4%, or from about 0.5% to about 3%, or from about 0.5% to about 2%, or from about 0.5% to about 1%, or from about 1% to about 5%, or from about 1% to about 4%, or from about 1% to about 3%, or from about 1% to about 2%, or from about 2% to about 5%, or from about 2% to about 4%, or from about 2% to about 3%, or from about 3% to about 5%, or from about 3% to about 4%, or from about 4% to about 5%, or about 0.5%, 1%, 2%, 3%, 4%, 5%, or 3.8% w/w of the aqueous priming coating composition.

In embodiments, the aqueous priming coating composition may further comprise a liquid binder. The liquid binder may comprise colloidal silica, colloidal alumina, a deflocculant and combinations thereof.

In embodiments, the concentration of the colloidal silica may be up to 12% w/w, or up to 11% w/w, or up to 10% w/w, or up to 9% w/w, or up to 8% w/w, or up to 7% w/w, or up to 6% w/w, or up to 5% w/w, or up to 4% w/w, or up to 3% w/w, or up to 2% w/w, or up to 1% w/w, or up to 0.5%, or from about 0.5% to about 12%, or from about 0.5% to about 11%, or from about 0.5% to about 10%, or from about 0.5% to about 9%, or from about 0.5% to about 8%, or from about 0.5% to about 7%, or from about 0.5% to about 6%, or from about 0.5% to about 5%, or from about 0.5% to about 4%, or from about 0.5% to about 3%, or from about 0.5% to about 2%, or from about 0.5% to about 1%, or from about 1% to about 12%, or from about 1% to about 11%, or from about 1% to about 10%, or from about 1% to about 9%, or from about 1% to about 8%, or from about 1% to about 7%, or from about 1% to about 6%, or from about 1% to about 5%, or from about 1% to about 4%, or from about 1% to about 3%, or from about 1% to about 2%, or from about 2% to about 12%, or from about 2% to about 11%, or from about 2% to about 10%, or from about 2% to about 9%, or from about 2% to about 8%, or from about 2% to about 7%, or from about 2% to about 6%, or from about 2% to about 5%, or from about 2% to about 4%, or from about 2% to about 3%, or from about 3% to about 12%, or from about 3% to about 11%, or from about 3% to about 10%, or from about 3% to about 9%, or from about 3% to about 8%, or from about 3% to about 7%, or from about 3% to about 6%, or from about 3% to about 5%, or from about 3% to about 4%, or from about 4% to about 12%, or from about 4% to about 11%, or from about 4% to about 10%, or from about 4% to about 9%, or from about 4% to about 8%, or from about 4% to about 7%, or from about 4% to about 6%, or from about 4% to about 5%, or from about 5% to about 12%, or from about 5% to about 11%, or from about 5% to about 10%, or from about 5% to about 9%, or from about 5% to about 8%, or from about 5% to about 7%, or from about 5% to about 6%, or from about 6% to about 12%, or from about 6% to about 11%, or from about 6% to about 10%, or from about 6% to about 9%, or from about 6% to about 8%, or from about 6% to about 7%, or from about 7% to about 12%, or from about 7% to about 11%, or from about 7% to about 10%, or from about 7% to about 9%, or from about 7% to about 8%, or from about 8% to about 12%, or from about 8% to about 11%, or from about 8% to about 10%, or from about 8% to about 9%, or from about 9% to about 12%, or from about 9% to about 11%, or from about 9% to about 10%, or from about 10% to about 12%, or from about 10% to about 11%, or from about 11% to about 12%, or from about 1.22% to about 9.49% w/w, or about 0.5%, 1%, 2%, 3%, 4%, 5%, 6%, 7%, 8%, 9%, 10%, 11%, 12%, or 1.22%, or 9.49% w/w of the aqueous priming coating composition.

In embodiments, the concentration of the colloidal alumina may be up to 14% w/w, or up to 13% w/w, or up to 12% w/w, or up to 11% w/w, or up to 10% w/w, or up to 9% w/w, or up to 8% w/w, or up to 7% w/w, or up to 6% w/w, or up to 5% w/w, or up to 4% w/w, or up to 3% w/w, or up to 2% w/w, or up to 1% w/w, or up to 0.5%, or from about 0.5% to about 14%, or from about 0.5% to about 13%, or from about 0.5% to about 12%, or from about 0.5% to about 11%, or from about 0.5% to about 10%, or from about 0.5% to about 9%, or from about 0.5% to about 8%, or from about 0.5% to about 7%, or from about 0.5% to about 6%, or from about 0.5% to about 5%, or from about 0.5% to about 4%, or from about 0.5% to about 3%, or from about 0.5% to about 2%, or from about 0.5% to about 1%, or from about 1% to about 14%, or from about 1% to about 13%, or from about 1% to about 12%, or from about 1% to about 11%, or from about 1% to about 10%, or from about 1% to about 9%, or from about 1% to about 8%, or from about 1% to about 7%, or from about 1% to about 6%, or from about 1% to about 5%, or from about 1% to about 4%, or from about 1% to about 3%, or from about 1% to about 2%, or from about 2% to about 14%, or from about 2% to about 13%, or from about 2% to about 12%, or from about 2% to about 11%, or from about 2% to about 10%, or from about 2% to about 9%, or from about 2% to about 8%, or from about 2% to about 7%, or from about 2% to about 6%, or from about 2% to about 5%, or from about 2% to about 4%, or from about 2% to about 3%, or from about 3% to about 14%, or from about 3% to about 13%, or from about 3% to about 12%, or from about 3% to about 11%, or from about 3% to about 10%, or from about 3% to about 9%, or from about 3% to about 8%, or from about 3% to about 7%, or from about 3% to about 6%, or from about 3% to about 5%, or from about 3% to about 4%, or from about 4% to about 14%, or from about 4% to about 13%, or from about 4% to about 12%, or from about 4% to about 11%, or from about 4% to about 10%, or from about 4% to about 9%, or from about 4% to about 8%, or from about 4% to about 7%, or from about 4% to about 6%, or from about 4% to about 5%, or from about 5% to about 14%, or from about 5% to about 13%, or from about 5% to about 12%, or from about 5% to about 11%, or from about 5% to about 10%, or from about 5% to about 9%, or from about 5% to about 8%, or from about 5% to about 7%, or from about 5% to about 6%, or from about 6% to about 14%, or from about 6% to about 13%, or from about 6% to about 12%, or from about 6% to about 11%, or from about 6% to about 10%, or from about 6% to about 9%, or from about 6% to about 8%, or from about 6% to about 7%, or from about 7% to about 14%, or from about 7% to about 13%, or from about 7% to about 12%, or from about 7% to about 11%, or from about 7% to about 10%, or from about 7% to about 9%, or from about 7% to about 8%, or from about 8% to about 14%, or from about 8% to about 13%, or from about 8% to about 12%, or from about 8% to about 11%, or from about 8% to about 10%, or from about 8% to about 9%, or from about 9% to about 14%, or from about 9% to about 13%, or from about 9% to about 12%, or from about 9% to about 11%, or from about 9% to about 10%, or from about 10% to about 14%, or from about 10% to about 13%, or from about 10% to about 12%, or from about 10% to about 11%, or from about 11% to about 14%, or from about 11% to about 13%, or from about 11% to about 12%, or from about 12% to about 14%, or from about 12% to about 13%, or from about 13% to about 14%, or about 0.5%, 1%, 2%, 3%, 4%, 5%, 6%, 7%, 8%, 9%, 10%, 11%, 12%, 13%, 14% or 10.36% w/w of the aqueous priming coating composition.

In embodiments, the liquid binder may also comprise a deflocculant, which is a compound that is added to the composition to minimize settling out, prevent flocculation and disperse the other ingredients, increase fluidity of the composition, and help form a colloid or suspension. The deflocculant may be selected from the group consisting of polyethylene glycol graft polymers such as castament® FS10, FS20 or FS60.

In embodiments, the deflocculant may be from about 6% to about 10% w/w, or from about 6% to about 9% w/w, or from about 6% to about 8% w/w, or from about 6% to about 7% w/w, or from about 7% to about 10% w/w, or from about 7% to about 9% w/w, or from about 7% to about 8% w/w, or from about 8% to about 10% w/w, or from about 8% to about 9% w/w, or from about 9% to about 10% w/w, or about 7.42% to about 7.64% w/w, or about 6%, 7%, 8%, 9%, 10%, or 7.42%, or 7.64% w/w of the aqueous priming coating composition.

Coatings Application Procedure

Both of the aqueous coating composition and the aqueous priming coating composition may be applied on surfaces of the carbon material (i.e. surfaces of the anodes) techniques well known in the art such as brushing, rolling, dipping and spraying. In the case of spraying, pressure or airless spraying can be used. Airless spraying is the preferred technique, mostly because it is rapid and promotes maximum coating homogeneity.

Therefore, there is also disclosed a chemical treatment for preventing or reducing air oxidation of a carbon material comprising a first layer comprising an aqueous priming coating composition according to the present invention (and described above), covering an external surface exposed to air of the carbon material; and a second layer, covering the first layer, comprising an aqueous coating composition according to the present invention and described above.

In embodiments, irrespectively of the application technique used, the aqueous priming coating composition should first be applied on the surfaces of the carbon material (i.e. surfaces of the anodes) to form the first layer. Multiple application of the aqueous priming coating composition. In embodiments, the first layer should have a wet film thickness (WFT) between about 0.3 to about 1 mm, or about 0.3 to about 0.9 mm, or about 0.3 to about 0.8 mm, or about 0.3 to about 0.7 mm, or about 0.3 to about 0.6 mm, or about 0.3 to about 0.5 mm, or about 0.3 to about 0.4 mm, or about 0.4 to about 1 mm, or about 0.4 to about 0.9 mm, or about 0.4 to about 0.8 mm, or about 0.4 to about 0.7 mm, or about 0.4 to about 0.6 mm, or about 0.4 to about 0.5 mm, or about 0.5 to about 1 mm, or about 0.5 to about 0.9 mm, or about 0.5 to about 0.8 mm, or about 0.5 to about 0.7 mm, or about 0.5 to about 0.6 mm, or about 0.6 to about 1 mm, or about 0.6 to about 0.9 mm, or about 0.6 to about 0.8 mm, or about 0.6 to about 0.7 mm, or about 0.7 to about 1 mm, or about 0.7 to about 0.9 mm, or about 0.7 to about 0.8 mm, or about 0.8 to about 1 mm, or about 0.8 to about 0.9 mm, or about 0.9 to about 1 mm, or about 0.1, 0.2, 0.3, 0.4, 0.5, 0.6, 0.7, 0.8, 0.9, 1.0 mm, and preferably about 0.5±0.1 mm.

Pursuant to the coating of the surface with the aqueous priming coating composition, the aqueous coating composition (pre-heated at 50° C.) should be applied on the first layer (the aqueous priming coating composition) within about 5 minutes and 2 hours following application of the aqueous priming coating composition (i.e., during the period when the aqueous priming coating composition drying is in progress) and preferably after at least 5 min following aqueous priming coating composition application (i.e., after aqueous priming coating composition strengthening initiation took place). It should be noted that longer room temperature drying period may promote the formation of a thin gel layer on the aqueous priming coating composition which would significantly reduce the adherence of the aqueous coating composition. Such gel layer formation may be prevented by pre-heating surface comprising the aqueous priming coating composition to around 110° C. prior applying the aqueous coating composition paint.

As shown in Example 13, aqueous coating composition pre-heating is required to reach the preferred (or recommended) working viscosity for airless spraying.

Again, multiple applications of the aqueous coating composition may be made. In embodiments, the second layer (i.e. the aqueous coating composition) should have a wet film thickness may be between about 0.15 and about 0.50 mm, or about 0.15 and about 0.45 mm, or about 0.15 and about 0.40 mm, or about 0.15 and about 0.35 mm, or about 0.15 and about 0.30 mm, or about 0.15 and about 0.25 mm, or about 0.15 and about 0.20 mm, or about 0.20 and about 0.50 mm, or about 0.20 and about 0.45 mm, or about 0.20 and about 0.40 mm, or about 0.20 and about 0.35 mm, or about 0.20 and about 0.30 mm, or about 0.20 and about 0.25 mm, or about 0.25 and about 0.50 mm, or about 0.25 and about 0.45 mm, or about 0.25 and about 0.40 mm, or about 0.25 and about 0.35 mm, or about 0.25 and about 0.30 mm, or about 0.30 and about 0.50 mm, or about 0.30 and about 0.45 mm, or about 0.30 and about 0.40 mm, or about 0.30 and about 0.35 mm, or about 0.35 and about 0.50 mm, or about 0.35 and about 0.45 mm, or about 0.35 and about 0.40 mm, or about 0.40 and about 0.50 mm, or about 0.40 and about 0.45 mm, or about 0.45 and about 0.50 mm, or about 0.20, 0.25, 0.30, 0.35, 0.40, 0.45, 0.50, and preferably 0.25±0.05 mm).

Humidity Levels

The aqueous coating composition using sodium and potassium carbonates (Example 10), unlike the aqueous priming coating composition, may be very sensitive to the atmospheric humidity levels because of the hygroscopicity of both sodium and mostly potassium carbonate. The alternative aqueous coating composition formula (Example 11), which uses sodium and potassium bicarbonates may be much less sensitive to humidity since the hygroscopicity of both sodium and potassium bicarbonates is much lower as compared to sodium and potassium carbonates, respectively. See Example 14.

When exposed to air with relative humidity in excess of about 40%, these salts convert to bicarbonates and/or to excess amount of hydrates which disrupt the coating due to molar volume increase. Therefore, according to an embodiment, the aqueous coating composition application should be made under 40% maximum relative humidity condition, which should be maintained up until the residual water content of the chemical treatment (aqueous coating composition+aqueous priming coating composition) reaches 2.5% w/w or less. For example, at a temperature of 30° C. and relative humidity of 40%, the latter maximum residual water content is reached after about 12 hours following aqueous coating composition application. After the above period, the coated anodes can be put in operation without suffering coating damage by thermal shock (see Example 15).

The coated anodes can also be stored at temperature higher than or equal to 5° C., irrespectively of the atmosphere relative humidity level (preferably below 70%). If the storage is made at above 40% relative humidity, the coated anodes will maybe need to be dried prior use to reduce their coating residual water content to 2.5% w/w or less, as demonstrated in Example 16 below.

According to another embodiment, there is disclosed a method for preparation of an aqueous coating formulation comprising the steps of
 a) solubilization in water of a sodium salt of carbonate in the presence of a potassium salt of carbonate to provide an equivalent $Na_2O:K_2O$ molar ratio varying between about 0.4 and 1.8, with sufficient mechanical and thermal energy to obtain a stable solution having no precipitation or hydrate formation, to obtain a first salt solution;
 b) mixing in the first salt solution an equivalent $Li_2O$ molar content varying between about 17% and about 74%, to obtain the aqueous coating formulation.

The sodium salt of carbonate may be selected from the group consisting of sodium carbonate ($Na_2CO_3$), and sodium bicarbonate ($NaHCO_3$), and combinations thereof.

The potassium salt of carbonate may be selected from the group consisting of potassium carbonate ($K_2CO_3$), and potassium bicarbonate ($KHCO_3$), and combinations thereof.

The equivalent $Li_2O$ molar content may be provided from a lithium salt of carbonate selected from the group consisting of lithium carbonate ($Li_2CO_3$), lithium bicarbonate ($LiHCO_3$), and combinations thereof, LiF, a mixture of LiF and NaF, and combinations of all of the above.

The sodium salt of carbonate and potassium salt of carbonate may be a combination of sodium carbonate and potassium carbonate.

The sodium salt of carbonate and potassium salt of carbonate may be a combination of sodium bicarbonate and potassium bicarbonate.

The concentration of the sodium carbonate may be from about 7% to about 17% w/w of the aqueous coating composition, from about 12% to about 14% w/w of the aqueous coating composition, or from about 12.75% to about 13.59% w/w of the aqueous coating composition.

The concentration of the sodium bicarbonate may be from about 11% to about 31% w/w of the aqueous coating composition, or from about 21.68% w/w of the aqueous coating composition.

The concentration of the potassium carbonate may be from about 15% to about 25% w/w of the aqueous coating composition, or from about 20% to about 22% w/w of the aqueous coating composition, or from about 20.32% to about 21.67% w/w of the aqueous coating composition.

The concentration of the potassium bicarbonate may be from about 19% to about 43% w/w of the aqueous coating composition or from about 31.58% w/w of the aqueous coating composition.

The lithium salt of carbonate may be lithium carbonate. The lithium carbonate may be in suspension in the aqueous coating composition. The concentration of the lithium carbonate may be from about 8% to about 18% w/w of the aqueous coating composition. The concentration of the lithium carbonate may be from about 13.83% to about 14.74% w/w of the aqueous coating composition.

In the method of the present invention, the composition may further comprise a liquid binder. The liquid binder may comprise colloidal silica, colloidal alumina, a deflocculant and combinations thereof.

The concentration of the colloidal silica is up to 5% w/w of the aqueous coating composition, or 0.65% w/w of the aqueous coating composition.

The concentration of the colloidal alumina is up to 8% w/w of the aqueous coating composition, or 5.55% w/w of the aqueous coating composition.

The deflocculant may be a polyethylene glycol graft polymer. The concentration of the deflocculant is up to 6% w/w of the aqueous coating composition.

The sufficient thermal energy may be at least 50° C.

The sufficient mechanical energy (or power) may be about 2 to about 5 mJoule/sec, or about 2 to about 4 mJoule/sec, or about 2 to about 3 mJoule/sec, or about 3 to about 5 mJoule/sec, or about 3 to about 4 mJoule/sec, or about 3 to about 5 mJoule/sec.

The method may further comprise the step, after step b), of mixing in the liquid binder.

The stable solution having no precipitation or hydrate formation may be stable for at least one month at room temperature.

The present invention will be more readily understood by referring to the following examples which are given to illustrate the invention rather than to limit its scope.

EXAMPLES

Sodium and Potassium Carbonates Dissolution

It has been unexpectedly found that the amount of sodium and potassium carbonates that can be dissolved into water may exceed their respective solubility limit when mixed together under specific conditions. It is in fact possible to obtain a 40.64% w/w $K_2CO_3$ and 25.5% w/w $Na_2CO_3$ aqueous solution exempt of precipitate and hydrate, even at temperature as low as 5° C. It should be noted that these two concentrations are those involved in the first preferred aqueous coating composition formula when considering the 50% w/w water content of both colloidal alumina and colloidal silica used.

As shown in the following examples, the best conditions for achieving total dissolution of the above salts mixture in water is to heat the latter at 40 to 50° C. and to mix the salts at 400-500 RPM using a high revolution magnetic stirrer.

Example 1

Preparation of $K_2Co_3$ and $Na_2CO_3$ Aqueous Salt Solution 1

533.07 g of distilled water was first inserted into a beaker. The water was then heated up to 50° C. (while preventing evaporation) prior to the addition of 216.66 g of potassium carbonate ($K_2CO_3$) (i.e., 40.64% w/w), which led to a sudden temperature increase up to 72.5° C. After 1 min of mixing at a speed of 400-500 RPM using a high revolution magnetic stirrer, the potassium carbonate was totally dissolved as expected (see Table 1 and FIG. 1). 135.93 g of sodium carbonate ($Na_2CO_3$) (i.e., 25.50% w/w) was then added to the solution while mixing at the same speed. After ten minutes, sodium carbonate dissolution was completed while the temperature dropped to 69.5° C. According to Table 1, 13.85% w/w of the sodium carbonate should have not been dissolved based on its solubility limit at 70° C. After 1 month storage at room temperature (25 to 31° C.) the aqueous solution was still unexpectedly showing no sign of precipitation or hydrates formation, nor after an additional 3 days storage at 18° C. inside a temperature controlled room.

TABLE 1

| | Water content | Carbonate content | Solubility at 70° C. (g/100 g | Required water content for complete $K_2CO_3$ dissolution | Available water content for $Na_2CO_3$ dissolution | Dissolved $Na_2CO_3$ content into available water | Undissolved $Na_2CO_3$ content | |
|---|---|---|---|---|---|---|---|---|
| | (g) | (g) | $H_2O$) | (g) | (g) | (g) | (g) | (% w/w) |
| $K_2CO_3$ | 533.07 | 216.66 | 139.5 | 155.31 | 377.76 | — | — | — |
| $Na_2CO_3$ | | 135.93 | 31 | — | | 117.11 | 18.82 | 13.85 |

Example 2

Preparation of $K_2Co_3$ and $Na_2Co_3$ Aqueous Salt Solution 2

Figure 2:
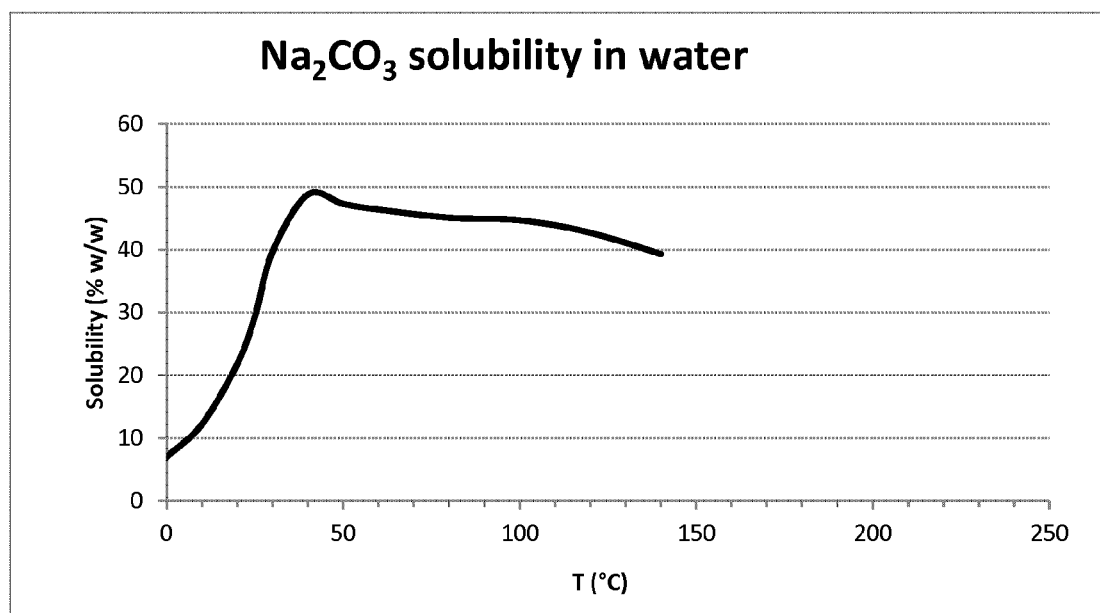
FIG. 2 illustrates the solubility of $Na_2CO_3$ salt in water.

533.07 g of distilled water was first inserted into a beaker. The water was heated up to 50° C. (while preventing evaporation) prior the addition of 135.93 g of sodium carbonate (i.e., 25.50% w/w) which led to a sudden temperature increase up to 63.2° C. After 5 min mixing at a speed of 400-500 RPM using a high revolution magnetic stirrer, the carbonate was totally dissolved as expected (see Table 2 and FIG. 2). 216.66 g of potassium carbonate (i.e., 40.64% w/w) was then added to the solution while mixing at the same speed. After five minutes, the sodium carbonate dissolution was completed, while the temperature reached 70.8° C. According to Table 2, 39.10% w/w of the potassium carbonate should have not been dissolved based on its solubility limit at 70° C. After 1 month storage at room temperature (25 to 31° C.) the aqueous solution was still unexpectedly showing no sign of precipitation or hydrates formation, nor after an additional 3 days storage at 18° C. inside a temperature controlled room.

TABLE 2

| | Water content | Carbonate content | Solubility at 70° C. (g/100 g | Required water content for complete $Na_2CO_3$ dissolution | Available water content for $K_2CO_3$ dissolution | Dissolved $K_2CO_3$ content into available water | Undissolved $K_2CO_3$ content | |
|---|---|---|---|---|---|---|---|---|
| | (g) | (g) | $H_2O$) | (g) | (g) | (g) | (g) | (% w/w) |
| $K_2CO_3$ | 533.07 | 216.66 | 139.5 | — | 94.59 | 131.95 | 84.71 | 39.10 |
| $Na_2CO_3$ | | 135.93 | 31 | 438.48 | | — | — | — |

Example 3

Preparation of $K_2Co_3$ and $Na_2Co_3$ Aqueous Salt Solution 3

533.07 g of distilled water was first inserted into a beaker and heated up to 50° C. (while preventing evaporation). A pre-homogenized mixture of 135.93 g of sodium carbonate (i.e., 25.50% w/w) and 216.66 g of potassium carbonate (i.e., 40.64% w/w) was then added into the water which led to a sudden temperature increase up to 75.8° C. After 10 min of mixing at a speed of 400-500 RPM using a high revolution magnetic stirrer, the two carbonates were totally dissolved and the temperature dropped to 66° C. After 1 month storage at room temperature (25 to 31° C.) the aqueous solution was still unexpectedly showing no sign of precipitation or hydrates formation, nor after an additional 3 days storage at 18° C. (inside a temperature controlled room) or after 5.5 hours storage at 5° C. (inside the cooling liquid of a thermostatic bath).

Example 4

Preparation of $K_2Co_3$ and $Na_2Co_3$ Aqueous Salt Solution 4

211.84 g of distilled water was first inserted into a beaker and heated up to 45° C. (while preventing evaporation). A pre-homogenized mixture of 54.37 g of sodium carbonate (i.e., 25.50% w/w) and 86.66 g of potassium carbonate (i.e., 40.64% w/w) was then added into the water which led to a sudden temperature increase up to 66° C. After 8 min of mixing at a speed of 400-500 RPM using a high revolution magnetic stirrer, the two carbonates were totally dissolved and the temperature dropped to 55.6° C. Then 2.78 g of colloidal silica (Levasil™ 50/80) were added into the solution and mixed at same angular velocity described above during 1 min. After 3 days storage at 18° C. inside a temperature controlled room, no sign of precipitation or hydrates formation was observed but coagulation of the colloidal silica took place, as expected, due to the high basicity of the solution (pH>12).

Example 5

Preparation of $K_2Co_3$ and $Na_2Co_3$ Aqueous Salt Solution 5

201.39 g of distilled water was first inserted into a beaker and heated up to 45.6° C. (while preventing evaporation). A pre-homogenized mixture of 54.37 g of sodium carbonate (i.e., 25.50% w/w) and 86.66 g of potassium carbonate (i.e., 40.64% w/w) was then added into the water which led to a sudden temperature increase up to 66.6° C. After 10 min of mixing at a speed of 400-500 RPM using a high revolution magnetic stirrer, the two carbonates were totally dissolved and the temperature dropped to 51° C. Then, 23.68 g of colloidal alumina (Aerodisp® W450 ZX) were added into the solution and mixed at the same angular velocity described above during 1 min. After 3 days storage at 18° C. inside a temperature controlled room, no sign of precipitation or hydrates formation was observed but coagulation of the colloidal alumina took place, as expected, due to the high basicity of the solution (pH>12).

Example 6

Preparation of $K_2Co_3$ and $Na_2Co_3$ Aqueous Salt Solution 6

200 g of distilled water was first inserted into a beaker and heated up to 43.5° C. (while preventing evaporation). A pre-homogenized mixture of 54.37 g of sodium carbonate (i.e., 25.50% w/w) and 86.66 g of potassium carbonate (i.e., 40.64% w/w) was then added into the water which led to a sudden temperature increase up to 64.3° C. After 20 min mixing at a speed of 400-500 RPM using a high revolution magnetic stirrer, the two carbonates were totally dissolved and the temperature dropped to 43.1° C. Then, 2.78 g of colloidal silica (Levasil™ 50/80) and 23.68 g of colloidal alumina (Aerodisp® W450 ZX) were added into the solution and mixed at same angular velocity described above during 1 min. After 3 days storage at 18° C. inside a temperature controlled room, no sign of precipitation or hydrates formation was observed but coagulation of both colloidal silica and alumina took place, as expected, due to the high basicity of the solution (pH>12).

Example 7

Preparation of $K_2Co_3$ and $Na_2Co_3$ Aqueous Salt Solution 7

533.07 g of distilled water was first inserted into a beaker and heated up to 40° C. (while preventing evaporation). A pre-homogenized mixture of 135.93 g of sodium carbonate (i.e., 25.50% w/w) and 216.66 g of potassium carbonate (i.e., 40.64% w/w) was then added into the water which led to a sudden temperature increase up to 63° C. After 15 min of mixing at a speed of 400-500 RPM using a high revolution magnetic stirrer, the two carbonates were totally dissolved and the temperature dropped to 50.9° C. After 1 month storage at room temperature (25 to 31° C.) the aqueous solution was still unexpectedly showing no sign of precipitation or hydrates formation. After the above storage period, 147.41 g of lithium carbonate (i.e., 27.65% w/w) was added to the solution and mixed at a speed of 400-500 RPM during 15 min. During mixing, the mixture temperature varied from 25.1 to 26.1° C. After about 1 hour storage at room temperature (~25° C.) lithium carbonate powder sedimentation was observed into the sealed container. The latter was then stored inside a temperature controlled room at 18° C. during 3 days. After this period, no sign of precipitation or hydrates formation were observed.

Example 8

Preparation of $K_2Co_3$ and $Na_2Co_3$ Aqueous Salt Solution 8

533.07 g of distilled water was first inserted into a beaker and heated up to 35° C. (while preventing evaporation). A pre-homogenized mixture of 135.93 g of sodium carbonate (i.e., 25.50% w/w) and 216.66 g of potassium carbonate (i.e., 40.64% w/w) was then added into the water which led to a sudden temperature increase up to 58.2° C. After 20 min of mixing at a speed of 400-500 RPM using a high revolution magnetic stirrer, the two carbonates were totally dissolved and the temperature dropped to 48.6° C. After 1 month storage at room temperature (25 to 31° C.) the aqueous solution was still unexpectedly showing no sign of precipitation or hydrates formation. However after an additional 2 days storage at 18° C. inside a temperature controlled room, precipitation and/or hydrates formation took place.

Example 9

Preparation of $K_2Co_3$ and $Na_2Co_3$ Aqueous Salt Solution 9

533.07 g of distilled water at room temperature (21.7° C.) was first inserted into a beaker. A pre-homogenized mixture of 135.93 g of sodium carbonate (i.e., 25.50% w/w) and 216.66 g of potassium carbonate (i.e., 40.64% w/w) was then added into the water which led to a sudden temperature increase up to 48° C. After 25 min of mixing at a speed of 400-500 RPM using a high revolution magnetic stirrer, the two carbonates were totally dissolved and the temperature dropped to 38.7° C. After 1 month storage at room temperature (25 to 31° C.) the aqueous solution was still unexpectedly showing no sign of precipitation or hydrates formation. However after an additional 2 days storage at 18° C. inside a temperature controlled room, precipitation and/or hydrates formation took place.

Example 10

Aqueous Coating Compositions

| AQUEOUS COATING formulation (% w/w) | | | | |
| --- | --- | --- | --- | --- |
| | 1 | 2 | Min | Max |
| Basic Solid | | | | |
| Lithium carbonate [1] | 13.83 | 14.74 | 8.00 | 18.00 |
| Sodium carbonate [1] | 12.75 | 13.59 | 7.00 | 17.00 |
| Potassium carbonate [1] | 20.32 | 21.67 | 15.00 | 25.00 |
| Sub total: | 46.90 | 50.00 | — | — |
| Liquid binder | | | | |
| Colloidal silica [2] | 0.65 | — | 0.00 | 5.00 |
| Colloidal alumina [2] | 5.55 | — | 0.00 | 8.00 |
| Deflocculant [3] | — | — | 0.00 | 6.00 |
| Water | 46.90 | 50.00 | 35.00 | 55.00 |
| Sub total: | 53.10 | 50.00 | — | — |
| Total: | 100.00 | 100.00 | — | — |

| Raw materials for aqueous coating composition | | |
| --- | --- | --- |
| Raw material | Trade name | Tyler Mesh |
| Lithium carbonate | — | −325 |
| Colloidal silica | Levasil ™ 50/80 | — |
| Colloidal alumina | W450 ZX | — |
| Deflocculant | Castament ™ FS10 | — |
| Water | Distilled | — |

| Chemical composition of the aqueous coating composition formulas (on a dry basis) | | |
| --- | --- | --- |
| | 1 | 2 |
| Components | (% w/w) | (% w/w) |
| $Al_2O_3$ | 5.55 | — |
| $CO_2$ | 40.00 | 42.65 |
| $K_2O$ | 27.70 | 29.53 |
| $Li_2O$ | 11.18 | 11.92 |
| $Na_2O$ | 14.91 | 15.90 |
| $SiO_2$ | 0.65 | — |
| Total: | 100 | 100 |

[1] Purity > 98%;
[2] Concentration = 50 wt. %; Particle size < 100 nm.
[3] At high concentration, monomeric deflocculants such as Castament FS10 may form a thin polymer layer on the exposed surface of the paint which may protect it against hydration and/or water adsorption under high atmospheric relative humidity condition (>40%).

Both colloida silica and alumina coagulate in the aqueous coating composition due to its high basicity (pH>12). Nevertheless, their use is preferred since their coagulated nano particles into the paint is believe to favor the adherence of the latter on the aqueous priming coating composition at temperature above 800° C.

Example 11

Alternative Aqueous Coating Compositions

| Alternative aqueous coating composition formula (% w/w) | | | |
| --- | --- | --- | --- |
| | Preferred | Min | Max |
| Basic Solid | | | |
| Lithium carbonate [1] | 14.84 | 6.00 | 23.00 |
| Sodium bicarbonate [1] | 21.68 | 11.00 | 31.00 |
| Potassium bicarbonate [1] | 31.58 | 19.00 | 43.00 |
| Sub total: | 68.10 | — | — |
| Liquid binder | | | |
| Colloidal silica [2] | 0.75 | 0.00 | 5.00 |
| Colloidal alumina [2] | 5.99 | 0.00 | 8.00 |
| Deflocculant [3] | 0.00 | 0.00 | 6.00 |
| Water | 25.16 | 14.00 | 46.00 |
| Sub total: | 31.90 | — | — |
| Total: | 100.00 | — | — |

| Raw materials for alternative aqueous coating composition | | |
| --- | --- | --- |
| Raw material | Trade name | Tyler Mesh |
| Lithium carbonate | — | −325 |
| Colloidal silica | Levasil ™ 50/80 | — |
| Colloidal alumina | W450 ZX | — |
| Deflocculant | Castament ™ FS10 | — |
| Water | Distilled | — |

| Chemical composition of the prefered Alternative aqueous coating composition formula (excluding free water) | |
| --- | --- |
| Components | (% w/w) |
| $Al2O_3$ | 4.19 |
| $CO_2$ | 47.68 |
| $H_2O$ (combined) | 7.22 |
| $K_2O$ | 20.79 |
| $Li_2O$ | 8.40 |
| $Na_2O$ | 11.19 |
| $SiO_2$ | 0.52 |
| Total: | 100 |

[1] Purity > 98%;
[2] Concentration = 50 wt. %; Particle size < 100 nm.
[3] At high concentration, monomeric deflocculants such as Castament ™ FS10 may form a thin polymer layer on the exposed surface of the paint which may protect it against hydration and/or water adsorption under high atmospheric relative humidity condition (> 40%).

Example 12

Aqueous Priming Coating Compositions

| Aqueous priming coating composition formula (% w/w) | | | | |
| --- | --- | --- | --- | --- |
| | 1 | 2 | Min | Max |
| Basic Solid | | | | |
| Calcined alumina [1] | 35.29 | 38.07 | 32.00 | 41.00 |
| Reactive alumina [1] | 7.41 | 7.99 | 6.00 | 9.00 |

-continued

| | | | | |
|---|---|---|---|---|
| White fused alumina. 0-0.2 mm [1] | 34.13 | 36.81 | 31.00 | 40.00 |
| Calcium carbonate [1] | 3.80 | — | 0.00 | 5.00 |
| Sub total: | 80.63 | 82.87 | — | — |
| Liquid binder | | | — | — |
| Colloidal silica [2] | 1.22 | 9.49 | 0.00 | 12.00 |
| Colloidal alumina [2] | 10.36 | — | 0.00 | 14.00 |
| Deflocculant | 0.3744 | — | 0.00 | 0.50 |
| Water | 7.42 | 7.64 | 6.00 | 10.00 |
| Sub total: | 19.37 | 17.13 | — | — |
| Total: | 100.00 | 100.00 | — | — |

Raw materials for aqueous priming coating composition

| Raw material | Trade name | Tyler Mesh |
|---|---|---|
| Calcined alumina | CL370 | — |
| Reactive alumina | CT3000SG | — |
| Cacium carbonate | — | −325 |
| Colloidal silica | Levasil ™ 50/80 | — |
| Colloidal alumina | W450 ZX | — |
| Deflocculant | Castament ™ FS10 | — |
| Water | Distilled | — |

Chemical composition of the prefered aqueous priming coating composition formulas (on a dry basis)

| Components | First Prefered (% w/w) | Second Prefered (% w/w) |
|---|---|---|
| $Al_2O_3$ | 96.38 | 94.18 |
| CaO | 2.54 | 0.03 |
| $Fe_2O_3$ | 0.01 | 0.01 |
| MgO | 0.10 | 0.11 |
| $Na_2O$ | 0.11 | 0.12 |
| $SiO_2$ | 0.80 | 5.50 |
| Others | 0.05 | 0.05 |
| Total: | 100 | 100 |

[1] Purity > 98%;
[2] Concentration = 50% w/w; Particule size < 100 nm.

Coagulation of colloida silica and colloidal alumina does not take place in the above alternative aqueous coating composition formula due to its low basicity (pH between 8 and 9).

Example 13

Aqueous Coating Composition Viscosity

The viscosity of the aqueous coating composition (embodiment 1 of example 10) was measured as a function of the temperature using a Brookfield Viscosimetre, Model No. LVDV-II+ and Serie No. RT 62296.
Test Conditions were as Follow:

| Viscosimetre | | Paint temperature | |
|---|---|---|---|
| Spindle | RPM | MIN | MAX |
| No. 2 | 50 | 28 | 71 |

Figure 3:
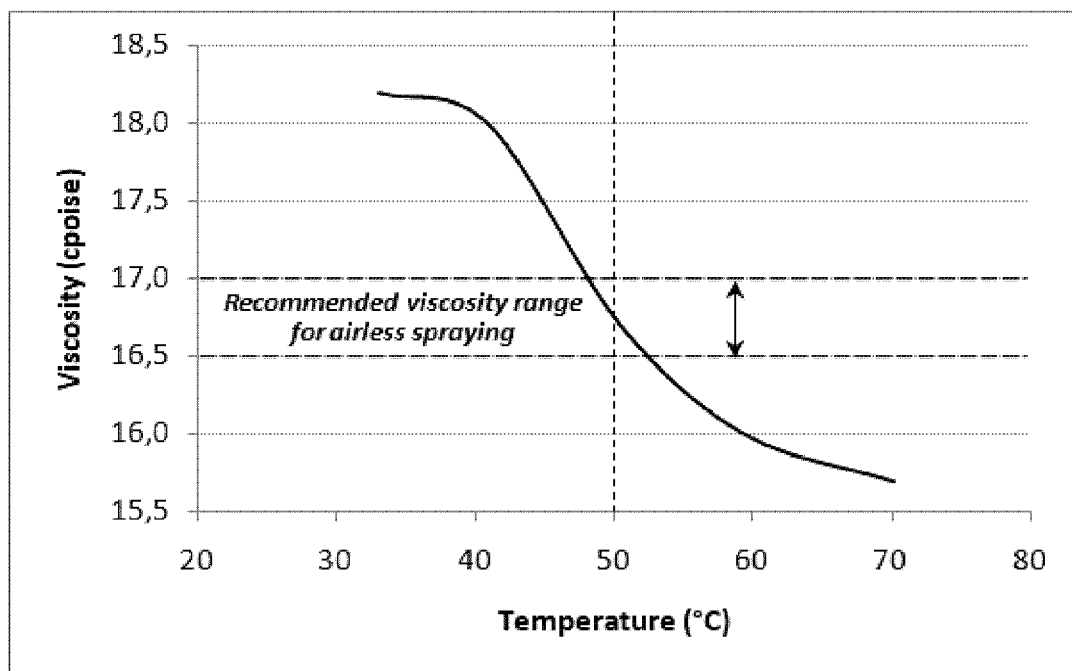
FIG. 3 illustrates the relationship between viscosity and temperature of an aqueous coating composition of the present invention. The recommended temperature of about 50±1.5° C. provides a viscosity range of about 16.5 to 17 cpoise.

The results are shown in FIG. 3, which show that a temperature of about 50° C.±1.5° C. is best for reaching a viscosity between 16.5 and 17 cPoise.

Example 14

Figure 4:
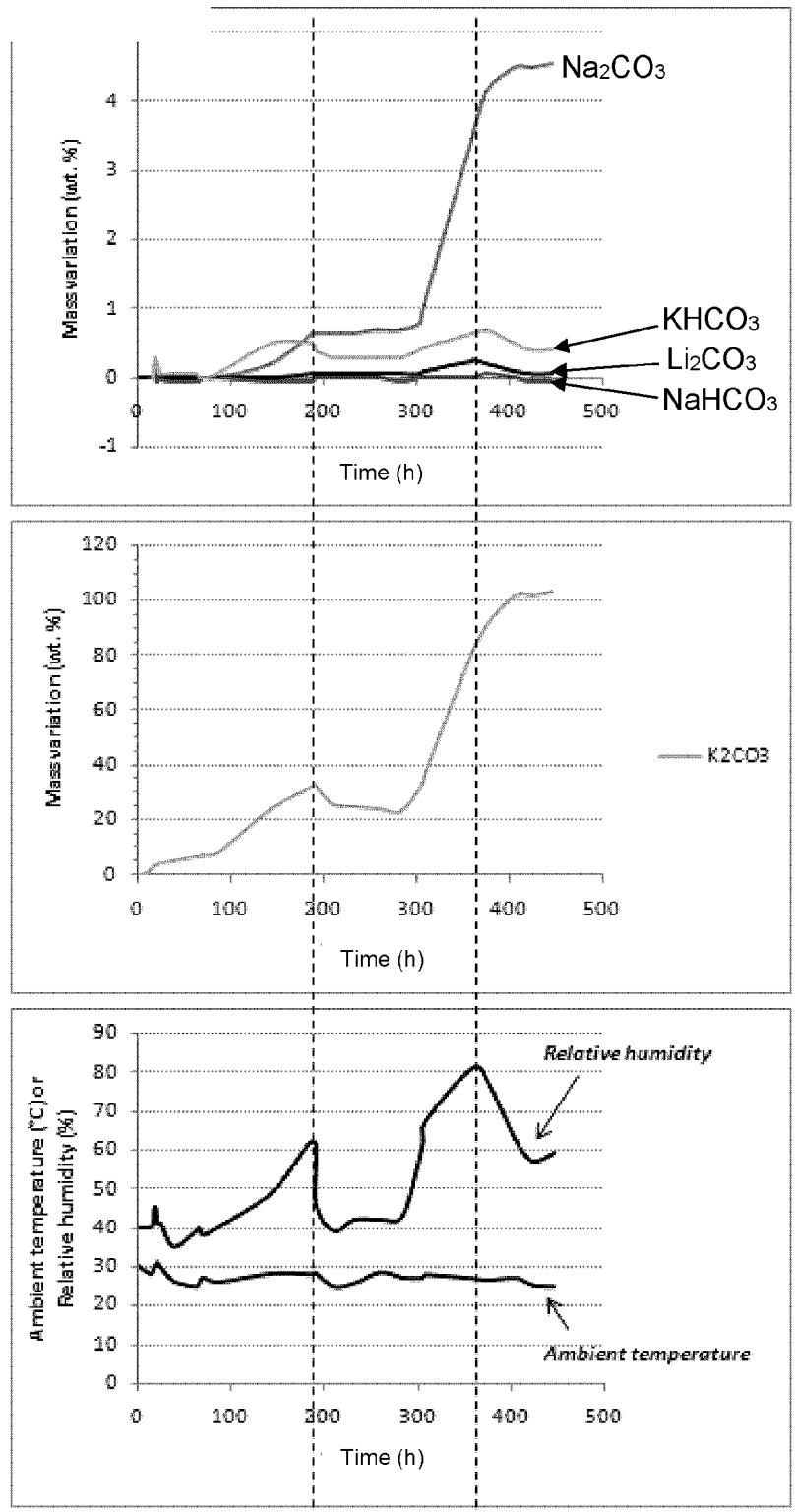
FIG. 4 illustrates the mass variation, relative humidity and ambient temperature of samples of $Na_2CO_3$, $K_2CO_3$, $Li_2CO_3$, $NaHCO_3$ and $KHCO_3$ powder over time.

Hygroscopicity of Carbonates and Bicarbonates $Na_2CO_3$, $K_2CO_3$, $Li_2CO_3$, $NaHCO_3$ and $KHCO_3$ powder samples (20 g each) were exposed to ambient atmosphere during a 445 hours period during which temperature and relative humidity varied between 25 and 31° C. and 35 and 81%, respectively. During that period, the mass variation of the samples was determined as shown on FIG. 4.

Example 15

Coating Procedure for Carbon Anodes

This method covers a procedure for the application of the chemical treatment of the present invention (i.e. a paint system) on anodes used in aluminum production. The chemical treatment comprises a first layer of aqueous priming coating composition, contacting the carbon anode, and a second layer of aqueous coating composition.

Spraying may be performed using an airless paint sprayer, such as a Graco Ultra MAX II 495 PC Pro™, with a gun of contractor type, with Tip model: LTX and tip number 521 (aqueous priming coating composition) and 517 (aqueous coating composition). The aqueous priming coating composition is applied at pressure: 1100-1200 psi (7584.2-8273.7 kPa, with a brand new tip, or 600-700 psi (4136.9-4826.3 kPa with a worn tip). Aqueous coating composition is applied at pressure: 800-900 psi (5515.81-6205.28 kPa with a brand new tip) and 400-500 psi (2757.9-3447.38 with a worn tip). The fan width decrease when the tip has been worn but is still useful. A hand compressed air sprayer such as a Wagner™ FLEXIO 570 Sprayer may also be used.

The two compositions may be mixed before use with various mixers such as hand drills, paint mixers, pillar drill, with wire whip mixer used at low speeds. Temperature may be controlled using a temperature controller including thermocouple and cable.

Substrate preparation: the anode must be dry. The substrate is cleaned by applying high pressure air on the surface, ensuring that all the dust and carbon powdered has been removed. Define the area to be painted and protect those that won't be.

Preparation of Aqueous Priming Coating Composition

1—Mix the paint and remove any solid that could have sedimented in the pail.
2—Using a hand with a clean glove make sure there is no solid in the bottom of the pail.
3—Place the one hole cover in the intake tube of the machine in order to avoid the paint drying.
4—Place a strainer in the intake tube and then place the pail of aqueous priming coating composition.
5—Set the machine at the required pressure.
6—Drain the machine by turning the prime valve down until paint appears and then return the prime valve in the horizontal position.
7—Drain the gun and hose until paint appears.

Application of Aqueous Priming Coating Composition

1—To begin painting keep the gun 18" (46 cm) from the surface to reach a 20" (51 cm) fan width approximately.

2—Apply the paint by spraying perpendicularly on the substrate. The pattern must be uniform and without showing heavy edges.
3—The total Wet Film Thickness (WFT) should be 0.5±0.1 mm. Each pass must have a thickness of maximum 0.2 mm to avoid dripping.
4—A wet film gage must be used for measuring the WFT as soon as each pass has been completed and the paint is still wet.
5—Place the gage in a flat section that will allow most of the gage teeth to contact the surface and then press firmly and evenly across it.
6—The paint leaves a trace in the gage, print it immediately on dark paper to confirm the measurement. Repeat the procedure in all sides of the anode.
7—Apply three passes one side at a time to reach the desired thickness waiting 16 minutes between each pass. Repeat the procedure until 4 sides and the top section are completed.
8—If necessary, remove the gun and clean it with water between the passes. After removing the gun cover the hose with a plastic cap to keep the paint fresh.
9—As soon as the 3 passes are applied in all sections of the anode make touch ups with the hand air sprayer by applying aqueous priming coating composition in those spots where the roughness is high and the paint doesn't reach completely the deepest surface.
10—If needed, remove the excess of paint caused by the touch ups.

Preparation of the Aqueous Coating Composition

1—Mix the paint and remove any solid that could have sedimented in the pail.
2—Using a hand with a clean glove make sure there is no solid in the bottom of the pail.
3—Add the aqueous coating composition in a metallic recipient.
4—Place the recipient on the hot plate heater. The heater must be connected to a temperature controller in order to keep the temperature at 50° C.
5—Place the two holes cover in the intake tube and insert the mixer. The paint must be mixed constantly.
6—Make sure the recipient is well closed to avoid losses by evaporation.
7—Set the machine at the required pressure.
8—Drain the machine by turning the prime valve down until paint appears and then return the prime valve in the horizontal position.
9—Drain the gun and hose until paint appears.

Application of the Aqueous Coating Composition

1—The aqueous coating composition should be applied 5 to 15 minutes after the last aqueous priming coating composition pass has been completed. By this time the aqueous priming coating composition must be dry at sight.
2—To begin painting keep the gun 12" (30.5 cm) from the surface to get a 10" (25.4 cm) fan width approximately.
3—Apply the paint by spraying perpendicularly on the substrate one side at a time until 4 sides and the top section are completed.
4—Begin the application on the upper section of the anode by spraying 3 continuous passes. Repeat the procedure in the lower section of the anode to reach its width. The pattern must be uniform and without showing heavy edges.
5—The final WFT for the three passes should be 0.25±0.05 mm.
6—A wet film gage must be used for measuring the WFT as soon as the 3 passes have been completed and the paint is still wet.
7—Place the gage in a flat section that will allow most of the gage teeth to contact the surface and then press firmly and evenly across it.
8—The paint leaves a trace in the gage, print it immediately on dark paper to confirm the measurement. Repeat the procedure in all sides of the anode.

Troubleshooting

Solid particles clogged in the tip: turn the tip 180 degrees and press the trigger until the tip is unblocked, then return the tip to the original position.

If the tip continues to be blocked: Remove the tip from the gun and wash it with water until the water flows easily through the tip. Replace the tip in the gun.

The pump output is low or the flow has completely stopped: Clean the intake valve.

Example 16

Anode Coating Thermal Shock Resistance

Carbone anode samples were coated by airless spraying, according to the disclosed procedure above in Example 15, and then dried at room temperature under different atmospheric conditions to get coatings with different residual water content prior thermal shock testing. The coated surface was about 130×85 mm$^2$. Thermal shock test was consisting: (1) Insert the coated samples into an electric furnace already operating at 1000° C., (2) Maintain the samples at that temperature for 15 min and (3) Remove the samples from the furnace and allow them to cool down to room temperature under natural convection.

Figure 5:
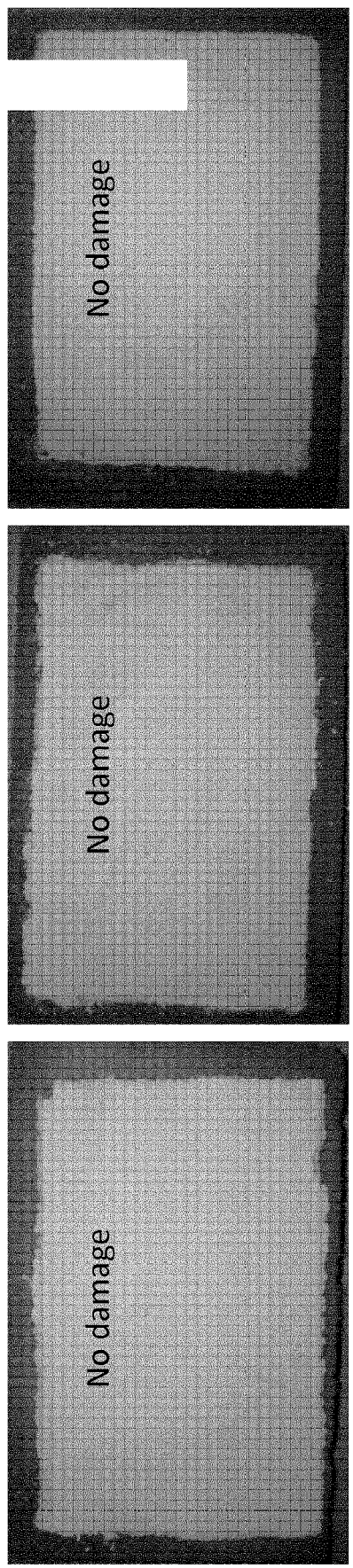
FIG. 5 illustrates the visual appearance of samples coated with coatings having 2.4 to 2.6% w/w residual water prior to testing, after cooling. No damage is apparent.
Figure 6:
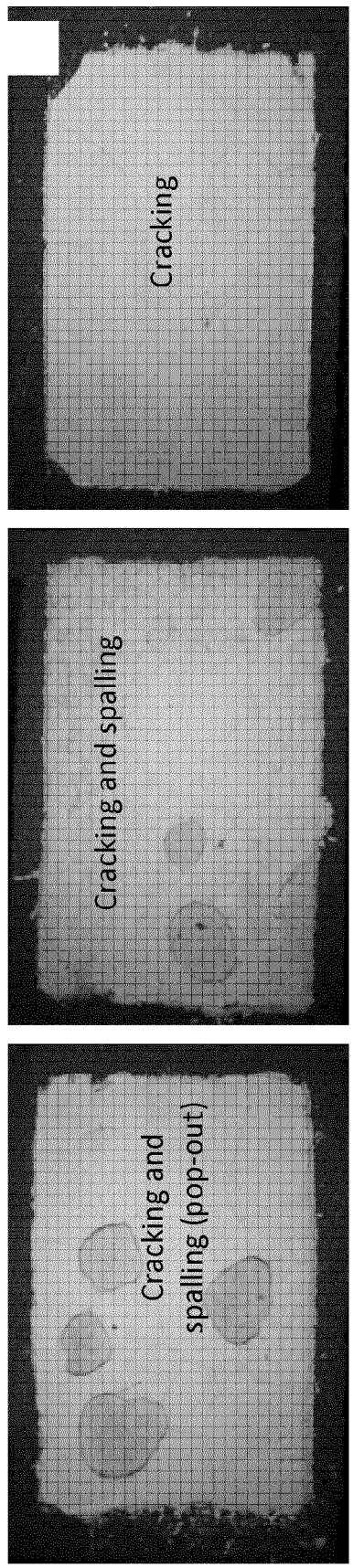
FIG. 6 illustrates the visual appearance of samples coated with coatings having 2.9 to 3.3% w/w residual water prior to testing, after cooling. Cracks and spalling (pop-out) after thermal shock is apparent.

The visual appearance of the tested samples after cooling is shown on FIGS. 5 and 6. Coatings with 2.4 to 2.6% w/w residual water prior to testing were not been damaged by thermal shock (see FIG. 5). However, coatings with 2.9 to 3.3% w/w residual water showed cracks and spalling (pop-out) after thermal shock (see FIG. 6). Therefore, the coating residual water content prior to anode insertion in the operating electrolysis cells, at around 1000° C., must be less than 12% w/w to prevent coating damage by thermal shock.

Example 17

Aqueous Coating Composition Production #1

This procedure applies to the aqueous coating composition formula 1 and 2 of Example 10, as well as all others whose sodium and potassium carbonates can be totally dissolved.

This procedure involves two major steps: (1) preparation of the sodium and potassium carbonates solution using a high revolution heating stirring system and (2) mixing of that solution with the other components of the composition using an appropriated mixer. The procedure for the first step, using a magnetic heating stirring system, and for the second step, using a planetary type mixer, is as follow:

| Step | Description |
|---|---|
| 1 | Sodium and potassium carbonates solution preparation |
| | 1.1 Add the water into the magnetic heating stirrer |
| | 1.2 Heat the water up to 50° C. by preventing evaporation |
| | 1.3 When water temperature reaches 50° C., start stirring at 400-500 RPM |
| | 1.4 Add the potassium carbonate and mix until its complete dissolution (less then 5 min) |
| | 1.5 Add the sodium carbonate and mix until its complete dissolution (less then 10 min) |
| | 1.6 Stop stirring and allow the solution to cool down up to 30° C. and less while preventing its evaporation |
| 2 | Final mix preparation |
| | 2.1 Add the above solution into the planetary type mixer |
| | 2.2 When applicable, add the deflocculant and mix at 90 to 120 RPM until its complete dissolution (about 2-3 min) |
| | 2.1 Add the lithium carbonate and mix at 95-105 RPM during 5 min |
| | 3.1 When applicable, add the colloidal binders and mix at 50-60 RPM for 2 min |
| | 3.3 Pursue mixing at 115-125 RPM until an homogenous liquid suspension is formed (about 5-10 min) |
| 4 | Packaging |
| | 4.1 Transfer the paint into a sealed plastic container and keep it to room temperature |

Example 18

Aqueous Coating Composition Production #2

This method applies to the aqueous coating composition formulas falling outside the preferred ranges and whose sodium and potassium carbonates cannot be totally dissolved. It must also be used when high revolution heating stirrer is not available. In such a case, the partially dissolved sodium and potassium carbonates in the paint, after its preparation, tend to crystallize heterogeneously on cooling from the undissolved salts, which leads to large monoclinic and/or orthorhombic crystals formation (up to 1 cm long and more). During storage, such crystallization of the paint continues to proceed when it is exposed to temperature drop. A solution to prevent or minimize the formation of such big crystals was found. It consists to decrease crystals initiation energy, while increasing their growing energy, by rapidly cooling an aqueous concentrated mixture of sodium and potassium carbonates leading to the formation of only small crystals (0.4 to 0.5 mm) that can be well dispersed in the paint after dilution.

The procedure to make the aqueous coating composition paint according to the present method involves three major steps: (1) preparation of a concentrated aqueous mixture of the paint's components, (2) rapid cooling of the concentrated mixture and (3) dilution of the cooled concentrated mixture.

Although several types of mixer and cooling system can be used, planetary type mixer and water cooling system are preferred.

The detailed procedure is given below.

| Step | Description |
|---|---|
| 1 | Preparation of the concentrate |
| | 1.1 Add water in the mixer whose amount must correspond to 85% of the total weight of salts intervening in the prepared batch of paint |
| | 1.2 When applicable, add the deflocculant and mix at 90 to 120 RPM until its complete dissolution (about 2-3 min) |
| | 1.3 While mixing at 35-40 RPM, progressively add the required total amounts of sodium and then potassium carbonates in the water |
| | 1.4 Increase the mixing angular velocity to 50-80 RPM and mix during 10-15 min. At the end of this period, the mixture temperature must be higher than 40° C. and preferably between 50 and 60° C. |
| | 1.5 Reduce the mixing angular velocity to 35-45 RPM and progressively add the required total amount of lithium carbonate and colloidal binders (when applicable) |
| | 1.6 Increase the mixing angular velocity to 50-80 RPM and mix during 2-5 min. At the end of this period, the mixture temperature must be at least 40° C. |
| 2 | Rapid cooling |
| | 2.1 Water cool the mixture at a rate of at least 1.5-2.0° C./min, while mixing at 50-80 RPM, until its temperature reaches a soaking value lying between 25 and 30° C. for at least 5-10 min (the small crystals are produced during that soaking period) (see Example 21) |
| | 2.2 Pursue the mixture cooling down to 20° C. with a cooling rate that could be less than 0.5° C./hr |
| 3 | Dilution |
| | 3.1 Add water into the mixture whose amount must correspond to 15% of the total weight of salts intervening in the prepared batch of paint. This must promotes a sudden mixture temperature drop of at least 5° C. |
| 4 | Packaging |
| | 4.1 Transfill the paint into a sealed plastic container and allow it to reach room temperature |

Figure 7:
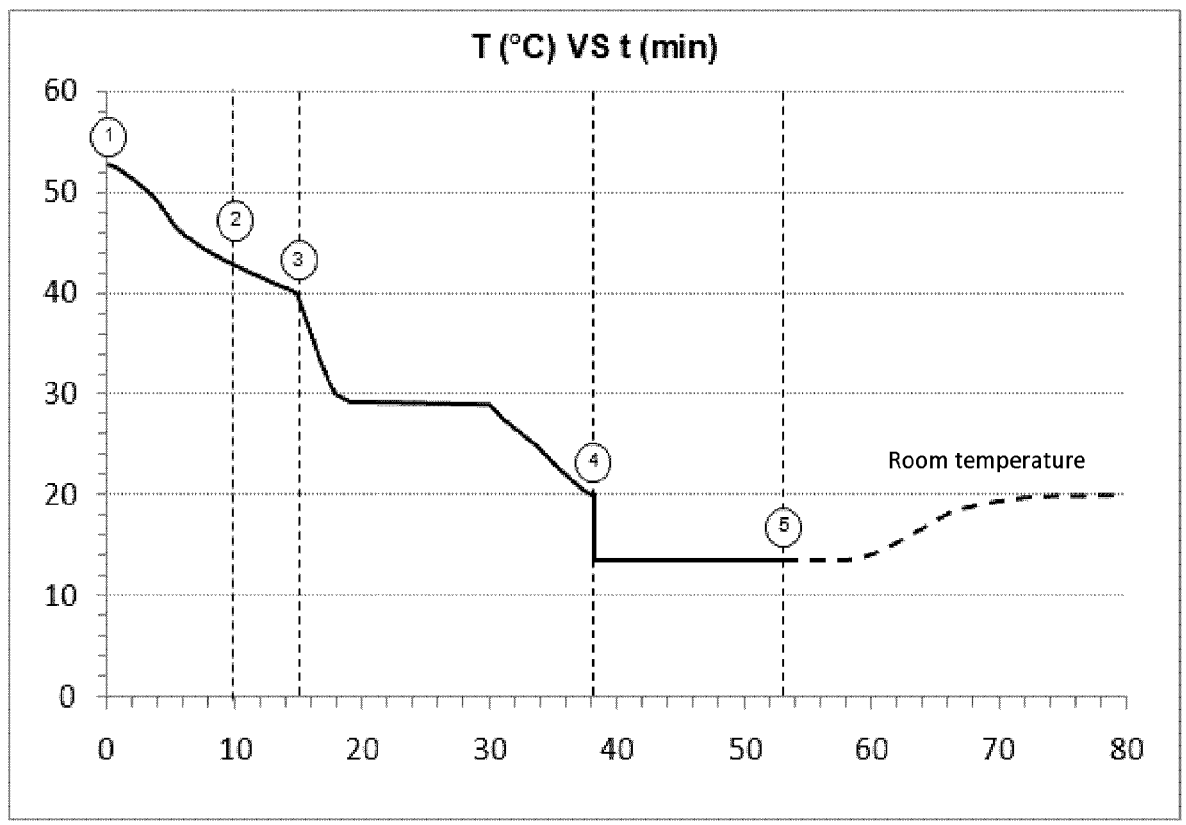
FIG. 7 illustrates the temperature variation during the preparation of an aqueous coating composition according to an embodiment of the present invention.

A typical mixture temperature variation taking place during the above preparation procedure is schematically shown in FIG. 7, where 1) is end of step 1.4, 2) is start of step 1.5, 3) is start of step 2.1, 4) is step 3.1 and 5) is at start of step 4.1.

Example 19

Aqueous Coating Composition Production #3

This method applies to the alternative aqueous coating composition formulas using sodium and potassium bicarbonates. Several procedures involving several types of mixers can be used. The preferred procedure using planetary type mixers is as follow:

| Step | Description |
|---|---|
| 1 | Add the water in the mixer |
| 2 | When applicable, add the deflocculant and mix at 90 to 120 RPM until its complete dissolution (about 2-3 min) |
| 3 | When applicable, add the colloidal binders and mix at 50-60 RPM for 2 min |
| 4 | Add the potassium bicarbonate and mix at 95-105 RPM during 5 min |
| 5 | Add the sodium bicarbonate and mix at 95-105 RPM during 5 min |
| 6 | Add the lithium carbonate and mix at 95-105 RPM during 5 min |
| 7 | Pursue mixing at 115-125 RPM until an homogenous liquid suspension is formed (about 5-10 min) |
| 8 | Transfill the paint into a sealed plastic container and keep it to room temperature |

Example 20

Aqueous Priming Coating Composition Production

A procedure using a planetary mixture is as follows:

| Step | Description | Designation |
|---|---|---|
| 1 | Liquid components mixture preparation | |
| 1.1 | Water/deflocculant mixture preparation | M1 |
| 1.1.1 | Add the water in the mixer. When a deflocculant is used, add the latter in the water and mix at 90 to 120 RPM until complete dissolution (about 2-3 min) | |
| 1.2 | M1/Liquid binders mixture preparation | M2 |
| 1, 2, 1 | Add the colloidal binders in mixture M1 and mix at 50-60 RPM during 0.5-1.0 min | |
| 2 | Solids components mixture preparation | M3 |
| 2.1 | Add the solid components in a clean same above type of mixer and mix at 50-60 RPM during 2 min | |
| 3 | M2/M3 mixture preparation | M4 |
| 3.1 | Add 70-80 wt. % of the liquid mixture M2 into the solid mixture M3 and mix at 50-60 RPM until a paste is formed leaving no free powder at the bottom of the mixer (about 4-6 min). | |
| 3.2 | Add the remaining liquid mixture M2 into the mixer and mix during 9-11 min by progressively increasing the mixing angular velocity from 50-60 RPM to 130-135 RPM | |
| 3.3 | Pursue mixing at 130-135 RPM until an homogenious liquid suspension is formed (about 5-10 min) | Paint |
| 4 | Packaging | |
| 4.1 | Transfill the paint into a sealed plastic container | |

Example 21

Figure 8:
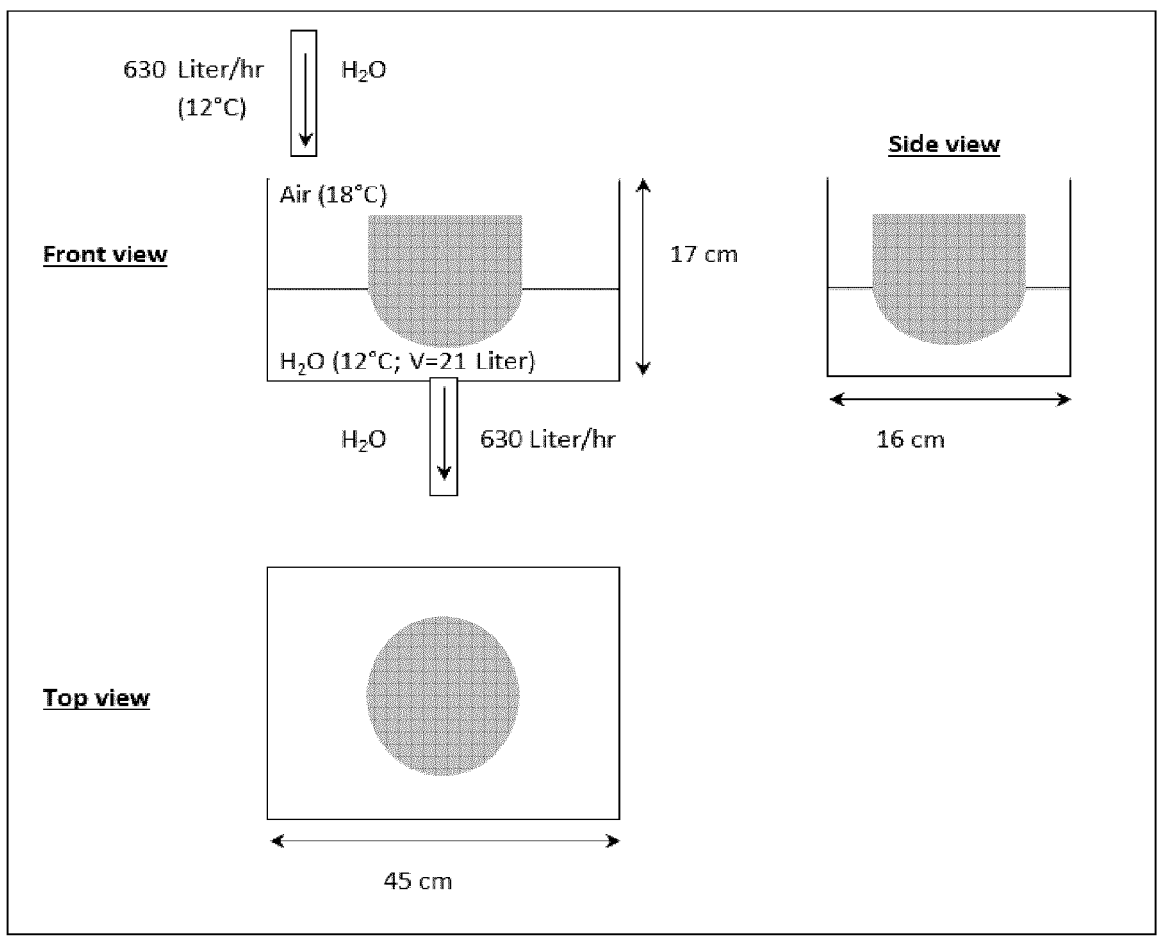
FIG. 8 illustrates an embodiment of a water cooling system for achieving rapid cooling during preparation of the aqueous coating compositions of the present invention; which may be contacted with a water source for cooling the prepared composition.
Figure 9:
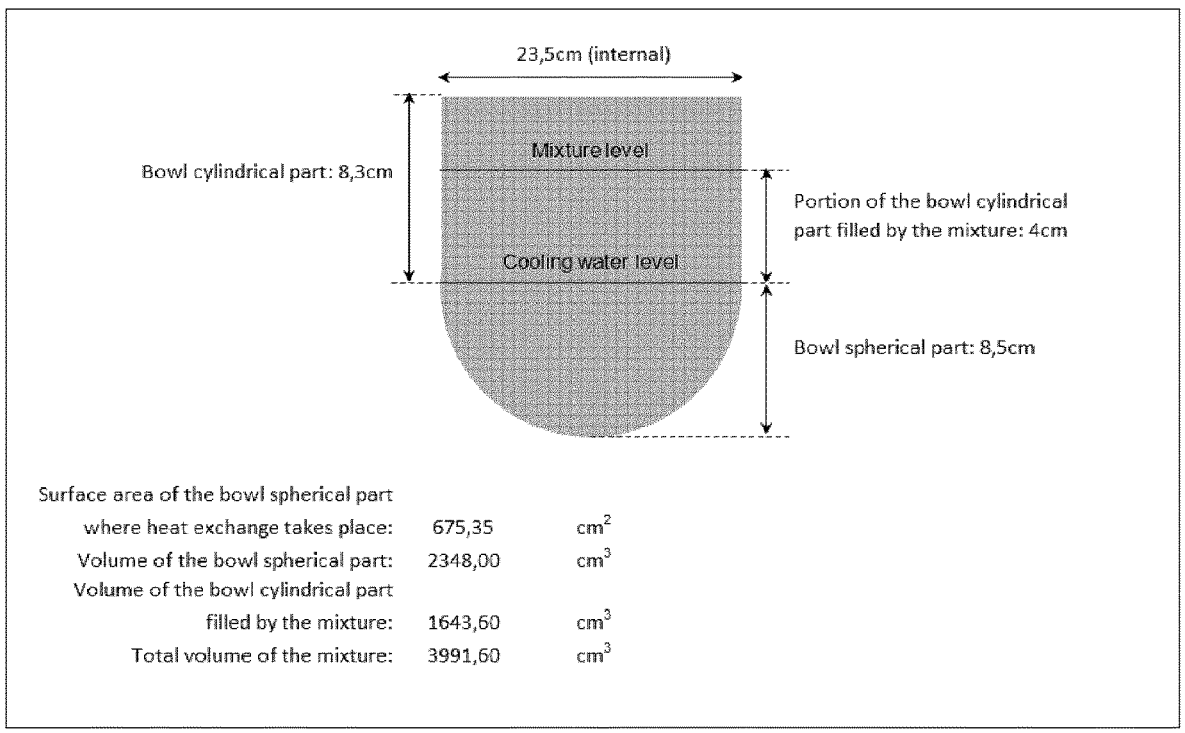
FIG. 9 illustrates an embodiment of a water cooling system for achieving rapid cooling during preparation of the aqueous coating compositions of the present invention; which may be contacted with a water source for cooling the prepared composition.
Figure 10:
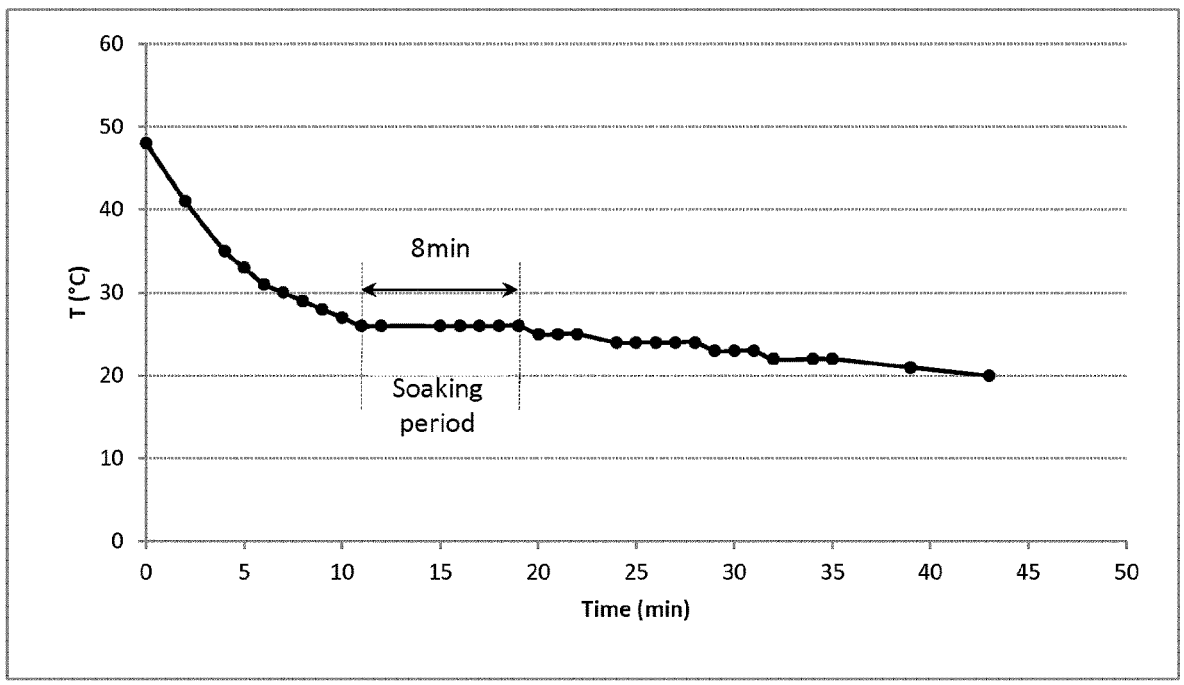
FIG. 10 illustrates the recorded mixture temperature variation upon cooling, according to an embodiment of the present invention.

Aqueous Coating Composition Production According to Example 18 with Rapid Cooling The first aqueous coating composition formula of Example 10 was prepared in a planetary type mixer according to Example 18. The water cooling system used for achieving the rapid cooling step in this method is shown on FIGS. 8 and 9, and the recorded mixture temperature variation upon cooling is shown in FIG. 10.

Example 22

Carbon Materials Air Reactivity Test Results

Example 22.1

Figure 11:
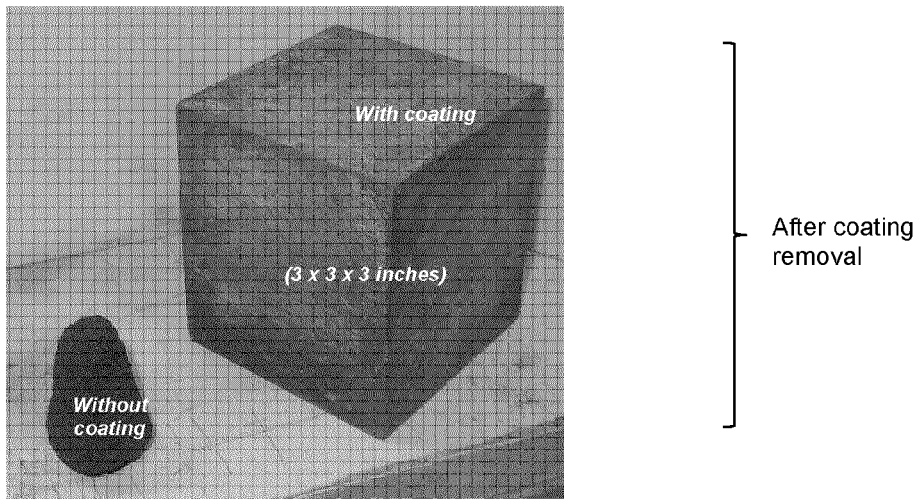
FIG. 11 illustrates the result of a comparative tests between coated and uncoated carbon electrode and show that an uncoated carbon electrode only has a 2.75% residual carbon content, while the coated electrode has 97.16% residual carbon content.
Figure 11:
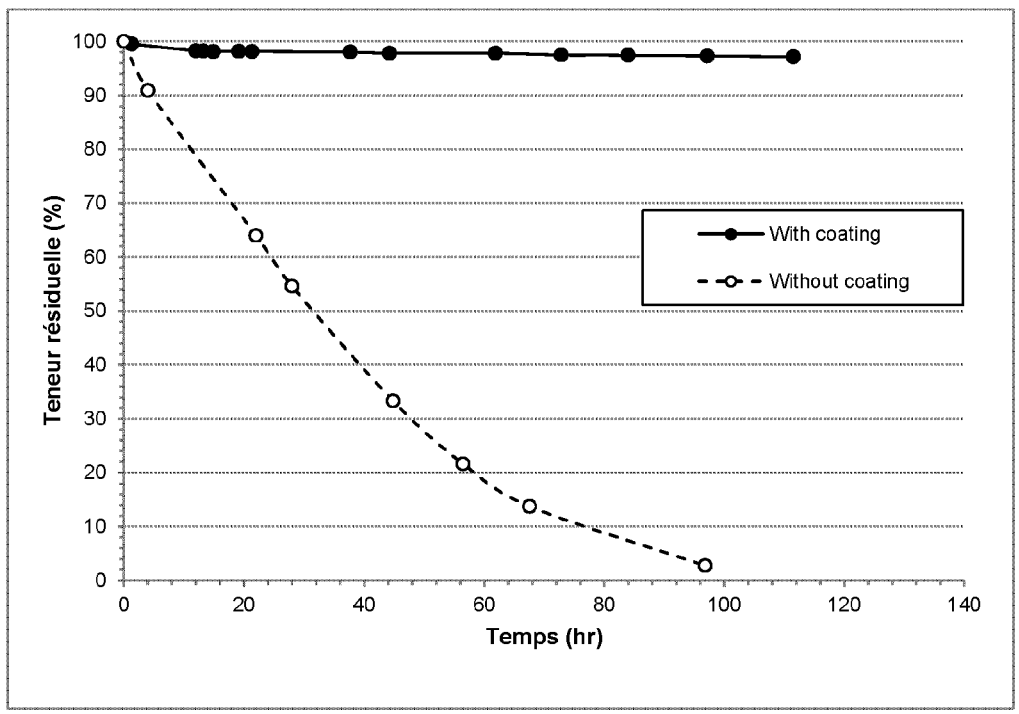

Two 3×3×3 inches (7.62×7.62×7.62 cm) graphite electrodes were submitted to air oxidation test at 650° C. during 112 hours. One of these two electrodes was coated by brushing using the aqueous priming coating composition 1 (aqueous priming coating composition, Example 12) and aqueous coating composition 1 (aqueous coating composition, Example 10), as previously disclosed. The results are shown in FIG. 11 and show that an uncoated carbon electrode only has a 2.75% residual carbon content, while the coated electrode has 97.16% residual carbon content.

Example 22.2

Figure 12:
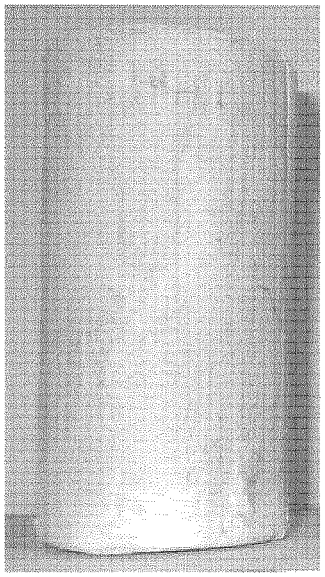
FIG. 12 illustrates the result of a comparative tests between coated and uncoated carbon electrode and show that an uncoated carbon electrode only has a 2.52% residual carbon content, while the coated electrode has 99.66% residual carbon content.
Figure 12:
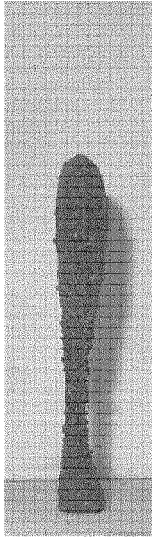
Figure 12:
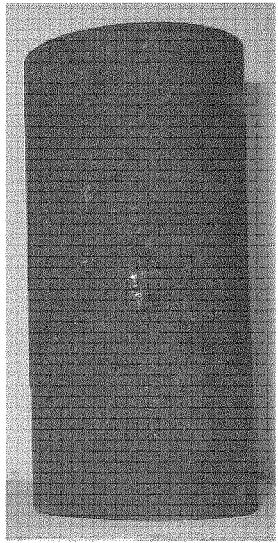

Two cylindrical carbon anode samples having a diameter of 50 mm and a height of 100 mm were submitted to air oxidation test at 650° C. during 20 hours. One of these two electrodes was coated by brushing using the aqueous priming coating composition 1 (aqueous priming coating composition, Example 12) and aqueous coating composition 1 (aqueous coating composition, Example 10). The results are shown in FIG. 12 and show that an uncoated carbon electrode only has a 2.52% residual carbon content, while the coated electrode has 99.66% residual carbon content.

Example 22.3

Figure 13:
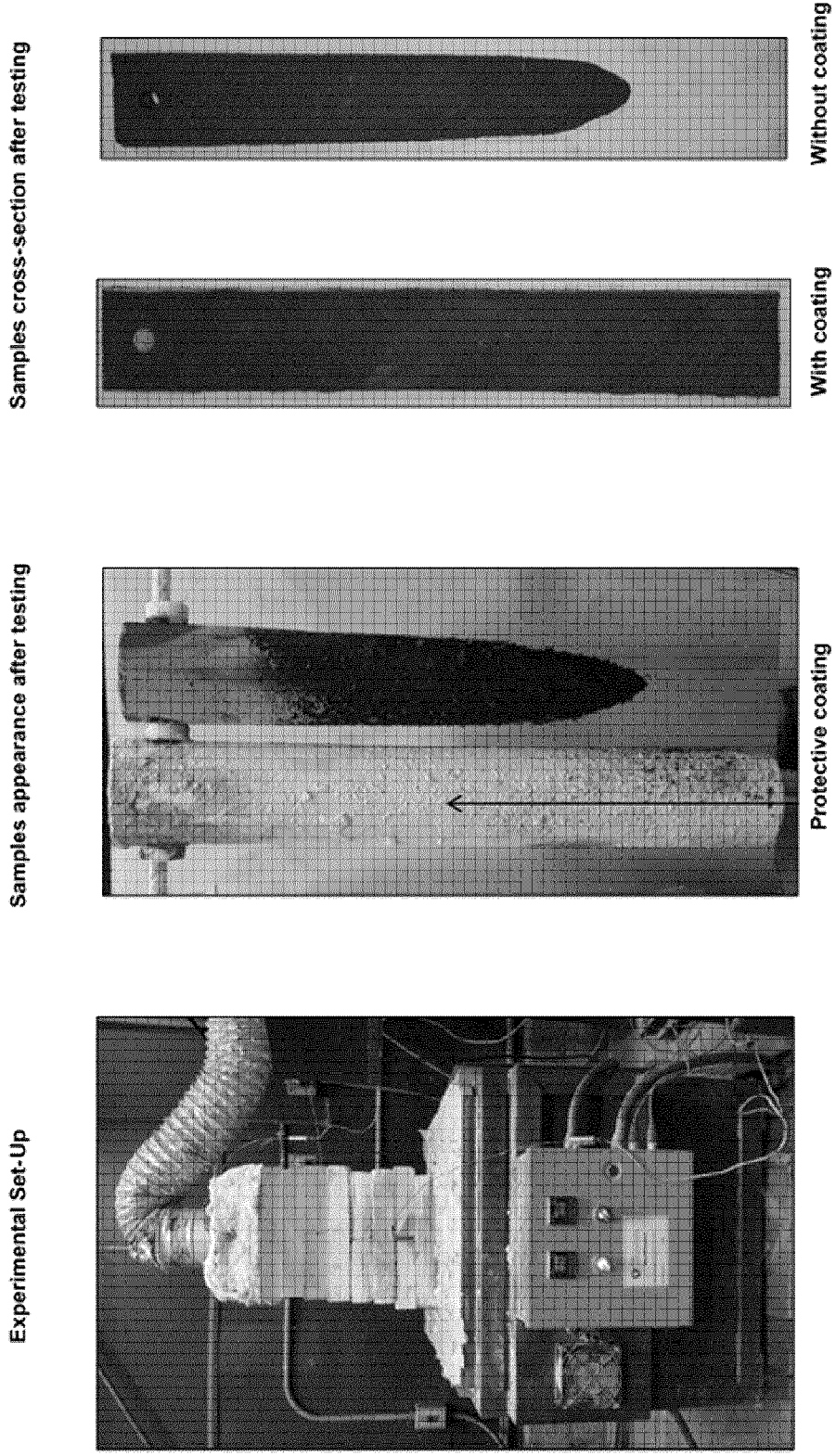
FIG. 13 illustrates the result of a comparative tests between coated and uncoated carbon electrode and show that an uncoated carbon electrode has a 47% carbon content weight loss, while the coated electrode has more than 99% residual carbon content.

An experimental set-up was used to test anode core samples (L=35.5 cm; ϕ=5 cm) oxidation resistance under thermal gradient conditions (Hot Face: 650° C.; Cold Face: 260° C.) in presence of NaF—AlF3 molten bath vapor. Without protection, using the aqueous priming coating composition 1 (aqueous priming coating composition, Example 12) and aqueous coating composition 1 (aqueous coating composition, Example 10), the anode core sample lost 47% of its weight after 18 hours testing. With the coating, no significant weight lost was detected. The appearance of the tested core samples as well as the experimental set-up are shown in FIG. 13.

Example 22.4

Two parallelepipedic carbon anode samples having an initial mass of 740 and 619 g were submitted to air oxidation test at 950° C. during 4 hours. The lightest sample was coated by brushing using the aqueous priming coating composition 2 (aqueous priming coating composition, Example 12) and aqueous coating composition 1 (aqueous coating composition, Example 10). Unlike the uncoated sample that underwent a weight loss of 73%, the residual carbon content of the coated sample was more than 99%.

Example 22.5

Figure 14:
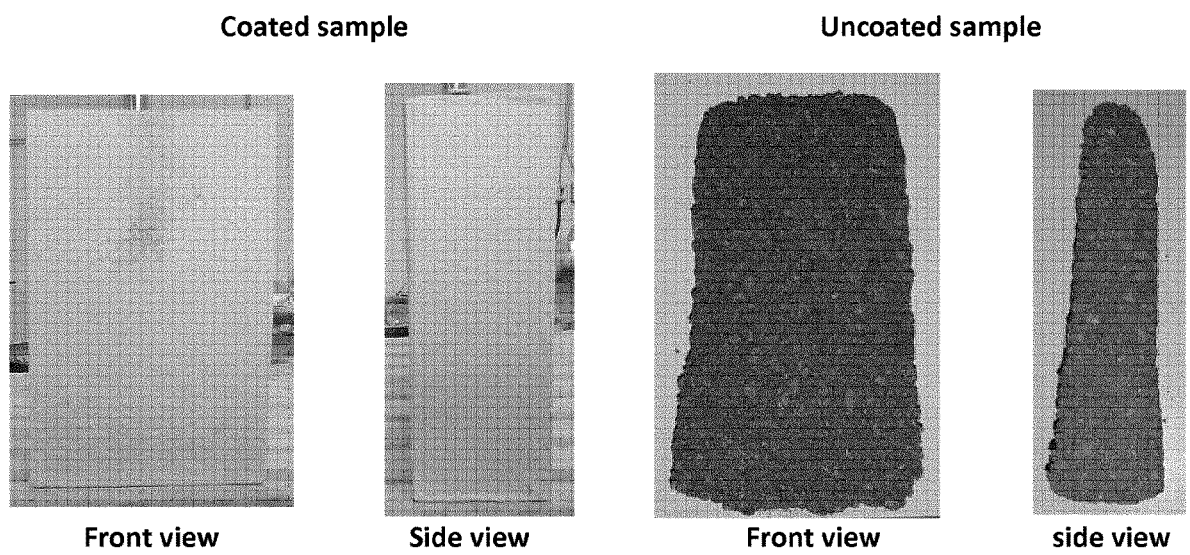
FIG. 14 illustrates the result of a comparative tests between coated and uncoated carbon electrode and show that an uncoated carbon electrode has a 66.10% carbon content weight loss, while the coated electrode has more than 98.41% residual carbon content.

Two parallelepipedic carbon anode samples having an initial mass of 1439 and 1350 g were submitted to air oxidation test at 450° C. during 38.17 hours. The heaviest sample was coated by brushing using the aqueous priming coating composition 1 (aqueous priming coating composition, Example 12) and preferred alternative aqueous coating composition (aqueous coating composition, Example 11) and the preferred alternative aqueous coating composition paint. Unlike the uncoated sample that underwent a weight loss of 66.10%, the residual carbon content of the coated sample was 98.41%. The appearance of the two samples after the test is shown in FIG. 14.

Example 23

Carbone Materials Air Reactivity Test Results

Figure 15:
FIG. 15 illustrates the result of a comparative tests between coated and uncoated carbon electrode and show that an uncoated carbon pursuant to aluminum electrolysis.
Figure 15:
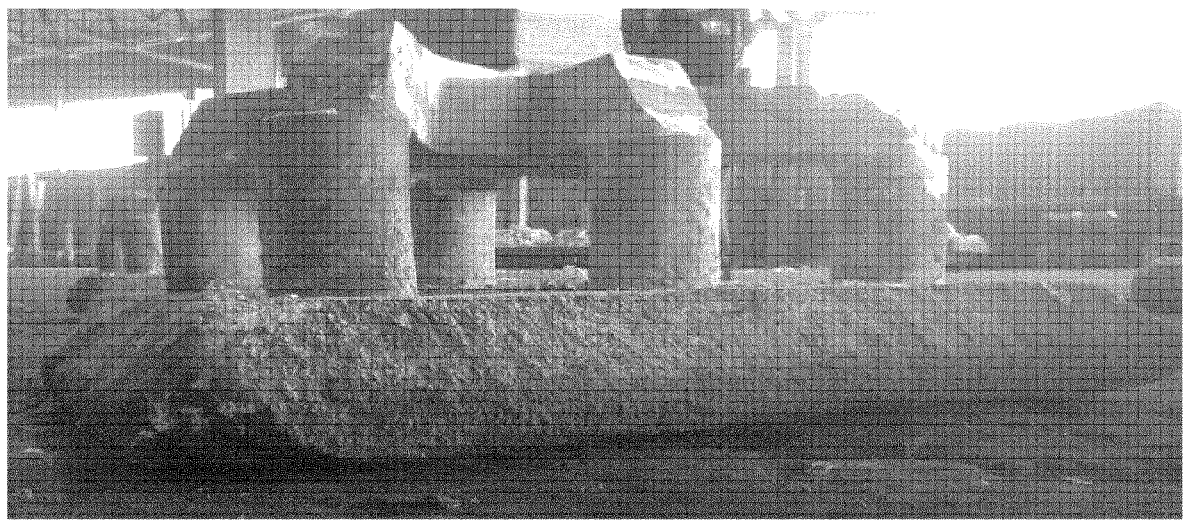

Six coated carbon anodes assemblies, each made from two blocks, were tested in an aluminum electrolysis cell operating at a current intensity of more than 370 KAmp. The performance of these anodes as well as the appearance of their butts were compared to those obtained from uncoated anodes of same origin and characteristics. FIG. 15 shows example of coated and uncoated anodes after use. Under these conditions, a 5% decrease in net carbon consumption, combined with a 5% decrease in current density, and an increase of 5% in aluminum production was observed for the coated anode over the uncoated anode. Therefore, unexpectedly, more aluminum was produced from a lesser current density, with a proportional preservation of the anode, which constitutes a significant improvement over the traditionally used uncoated anode.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. An aqueous coating composition for preventing or reducing air oxidation of a carbon material comprising:
   an aqueous solution comprising a combination of a sodium carbonate salt and
   a potassium carbonate salt providing an equivalent $Na_2O$:$K_2O$ molar ratio of about 0.4 to about 2.0, and
   water, wherein the aqueous coating composition further comprising a lithium salt providing an equivalent $Li_2O$ molar content varying between about 17% and about 74% of said aqueous coating composition,
   said aqueous coating having a melting temperature of up to about 600° C.

2. The aqueous coating composition of claim 1, wherein said equivalent $Na_2O$:$K_2O$ molar ratio is from about 0.4 to about 1.8 and provides an aqueous coating having a melting temperature of from about 370° C. to about 430° C.

3. The aqueous coating composition of claim 2, wherein said aqueous coating has a melting temperature of from about 400° C.

4. The aqueous coating of claim 1, wherein said sodium carbonate salt is selected from the group consisting of sodium carbonate ($Na_2CO_3$), and sodium bicarbonate ($NaHCO_3$), and combinations thereof.

5. The aqueous coating of claim 1, wherein said potassium carbonate salt is selected from the group consisting of potassium carbonate ($K_2CO_3$), and potassium bicarbonate ($KHCO_3$), and combinations thereof.

6. The aqueous coating of claim 1, wherein said lithium salt comprises:
   a lithium carbonate salt selected from the group consisting of lithium carbonate ($Li_2CO_3$), lithium bicarbonate ($LiHCO_3$), and combinations thereof,
   LiF, a mixture of LiF and NaF, and
   combinations of all of the above.

7. The aqueous coating of claim 1, wherein said combination of a sodium carbonate salt and a potassium carbonate salt is a combination of sodium carbonate and potassium carbonate.

8. The aqueous coating of claim 1, wherein said combination of a sodium carbonate salt and a potassium carbonate salt is a combination of sodium bicarbonate and potassium bicarbonate.

9. The aqueous coating of claim 4, wherein concentration of said sodium carbonate is from about 7% to about 17% w/w, or from about 12% to about 14% w/w of said aqueous coating composition.

10. The aqueous coating of claim 4, wherein concentration of said sodium bicarbonate is from about 11% to about 31% w/w of said aqueous coating composition.

11. The aqueous coating of claim 5, wherein concentration of said potassium carbonate is from about 15% to about 25% w/w, or from about 20% to about 22% w/w of said aqueous coating composition.

12. The aqueous coating of claim 5, wherein concentration of said potassium bicarbonate is from about 19% to about 43% w/w of said aqueous coating composition.

13. The aqueous coating of claim 6, wherein said lithium salt is lithium carbonate.

14. The aqueous coating of claim 13, wherein lithium carbonate is in suspension in said aqueous coating composition.

15. The aqueous coating of claim 6, wherein concentration of said lithium carbonate is from about 8% to about 18% w/w of said aqueous coating composition.

16. The aqueous coating of claim 1, further comprising a liquid binder.

17. The aqueous coating of claim 16, wherein said liquid binder comprises colloidal silica, colloidal alumina, a deflocculant and combinations thereof.

18. The aqueous coating of claim 17, wherein concentration of said colloidal silica is up to 5% w/w of said aqueous coating composition.

19. The aqueous coating of claim 17, wherein concentration of said colloidal alumina is up to 8% w/w of said aqueous coating composition.

20. The aqueous coating of claim 17, wherein said deflocculant is a polyethylene glycol graft polymer.

21. The aqueous coating of claim 17, wherein concentration of said deflocculant is up to 6% w/w of said aqueous coating composition.

* * * * *